United States Patent
Curcio et al.

(10) Patent No.: US 9,436,875 B2
(45) Date of Patent: Sep. 6, 2016

(54) METHOD AND APPARATUS FOR SEMANTIC EXTRACTION AND VIDEO REMIX CREATION

(71) Applicant: Nokia Technologies Oy, Espoo (FI)

(72) Inventors: Igor Danilo Diego Curcio, Tampere (FI); Sujeet Shyamsundar Mate, Tampere (FI); Francesco Cricri, Tampere (FI); Mikko Joonas Roininen, Tampere (FI); Sailesh Sathish, Tampere (FI)

(73) Assignee: Nokia Technologies Oy, Espoo (FI)

( * ) Notice: Subject to any disclaimer, the term of this patent is extended or adjusted under 35 U.S.C. 154(b) by 561 days.

(21) Appl. No.: 13/707,090

(22) Filed: Dec. 6, 2012

(65) Prior Publication Data
US 2014/0161354 A1    Jun. 12, 2014

(51) Int. Cl.
| | | |
|---|---|---|
| H04N 9/80 | (2006.01) | |
| H04N 5/93 | (2006.01) | |
| G11B 27/00 | (2006.01) | |
| G06K 9/00 | (2006.01) | |
| G06K 9/62 | (2006.01) | |

(52) U.S. Cl.
CPC ....... *G06K 9/00718* (2013.01); *G06K 9/00744* (2013.01); *G06K 9/629* (2013.01)

(58) Field of Classification Search
USPC ................................. 386/223–228, 248, 278
See application file for complete search history.

(56) References Cited

U.S. PATENT DOCUMENTS

| 8,600,402 | B2 | 12/2013 | Mate et al. | |
|---|---|---|---|---|
| 2009/0169168 | A1* | 7/2009 | Ishikawa | 386/52 |
| 2013/0093899 | A1 | 4/2013 | Curcio et al. | |
| 2013/0141521 | A1* | 6/2013 | Williams | 348/36 |
| 2013/0177293 | A1 | 7/2013 | Mate et al. | |

FOREIGN PATENT DOCUMENTS

EP    1 850 321 A1    10/2007

OTHER PUBLICATIONS

Borth, Damlan, et al.; "TubeFiler: an automatic web video categorizer"; In Proceedings of the 17th ACM international conference on Multimedia (MM '09) ACM, New York, NY, USA, pp. 1111-1112.

Glasberg et al.; "New Real-Time Approaches for Video-Genre-Classification Using High-Level Descriptors and a Set of Classifiers"; In Proceedings of the 2008 IEEE International Conference on Semantic Computing (ICSC '08); IEEE Computer Society, Washington, DC, USA, 120-127.

(Continued)

*Primary Examiner* — Nigar Chowdhury
(74) *Attorney, Agent, or Firm* — Alston & Bird LLP

(57) ABSTRACT

A method, apparatus and computer program product are provided for extracting semantic information from user-generated media content to create a video remix which is semantically enriched. An exemplary method comprises extracting media content data and sensor data from a plurality of media content, wherein the sensor data comprises a plurality of data modalities. The method may also include classifying the extracted media content data and the sensor data. The method may further include detecting predefined objects or events utilizing the sensor data to create remix video.

21 Claims, 10 Drawing Sheets

(56) References Cited

OTHER PUBLICATIONS

Jaser, Edward, et al.; "Hierarchical decision making scheme for sports video categorisation with temporal post-processing"; In Proceedings of the 2004 IEEE computer society conference on Computer vision and pattern recognition (CVPR04); IEEE Computer Society, Washington, DC, USA, 908-913.

Yuan, Xun, et al.; "Automatic Video Genre Categorization using Hierarchical SVM"; Image Processing, 2006 IEEE International Conference on, pp. 2905-2908, Oct. 2006.

Zhang, Jiwei, et al.; "A modified sports genre categorization framework based On close-up view pre-detection"; Broadband Network and Multimedia Technology (IC-BNMT, 2011 4th IEEE International Conference; pp. 301-305; Oct. 28-30, 2011.

Zhang, N, et al; "A generic approach for systematic analysis of sports videos"; ACM Trans. Intell. Syst. Technol. 3, 3, Article 46 (May 2012), 29 pages.

\* cited by examiner

METHOD AND APPARATUS FOR SEMANTIC EXTRACTION AND VIDEO REMIX CREATION

TECHNOLOGICAL FIELD

Embodiments of the present invention relate generally to media content and, more particularly, relate to a method, apparatus, and computer program product for extracting semantic information from user-generated media content to create a video remix which is semantically enriched.

BACKGROUND

At public events, such as concerts, theater performances and/or sporting events, it is increasingly popular for users to capture these public events using a camera and then store the captured events as media content, such as an image, a video, an audio recording and/or the like. Media content is even more frequently captured by a camera or other image capturing device attached to a mobile terminal.

BRIEF SUMMARY

A method, apparatus and computer program product are therefore provided according to an example embodiment of the present invention to automatically generate a single- or multi-camera remix video which consists of a sequence of video segments extracted from the original videos. The method, apparatus and computer program product according to an example embodiment may also be configured to extract semantic features from the user-generated media content, apply an event template and create a semantically enriched video remix which consists of a sequence of video segments extracted from the original videos.

One example method may include classifying recorded data according to an event type. The recorded data may comprise a plurality of modalities. The method may also include selecting an event template based on the event type, wherein the event template comprises a set of event-specific image templates. The method may further include detecting one or more predefined objects or one or more predefined events in the recorded data in accordance with the event template. The method may further include creating a remix video utilizing the event template and the one or more predefined objects or the one or more predefined events and, in another embodiment, causing presentation of the remix video.

The classifying of the recorded data may comprise estimating a quality level of each input data modality, extracting one or more features from one or more of the plurality of data modalities, classifying the one or more extracted features, performing relation analysis for discovering correlative relations, anti-correlative relations, or a combination thereof between the one or more extracted features, and performing fusion of feature classification using relation analysis results, quality levels of the input data modalities, location information, or a combination thereof to determine the event type. The event template may comprise information related to assigning roles to one or more recording devices, selecting a sub-set of editing rules, selecting a sub-set of potential salient events, and selecting a sub-set of potential salient objects. The fusion may be performed by majority voting, non-weighted average, weighted average, or using an additional classifier. The method may comprise assigning roles for one or more recording devices, according to the event type template, to record one or more potential salient events or one or more potential salient objects.

The assigning of roles is a function of one or more of a number of recording devices, a capability of the recording devices, preference information of a person associated with the event, preference information of a person associated with the remix video. The detecting of the predefined object in the recorded data may comprise selecting a sub-set of image templates and performing template matching. Selecting of the sub-set of image templates further comprises matching the auxiliary sensor data from the recorded data with auxiliary data associated to available templates. The auxiliary sensor data may be compass data, accelerometer data, gyroscope data, location information, or a combination thereof. Selecting of the sub-set of image templates further comprises selecting templates with a highest score in an instance in which a difference between the auxiliary data of the recorded data and one of the templates is less than a predetermined threshold, wherein selecting of the sub-set of image templates further comprises analyzing auxiliary sensor data captured in the recorded data, and utilizing an offline phase and an online phase, wherein the offline phase comprises collecting a set of multimodal templates, and causing image templates and associated metadata information to be stored, wherein the associated metadata information is auxiliary sensor data, and wherein the online phase comprises template matching on the recorded data. Template matching may further comprise extracting features from the sub-set of image templates, extracting features from the recorded data, and matching the extracted features.

An example apparatus may include at least one processor and at least one memory storing computer program code, wherein the at least one memory and stored computer program code are configured, with the at least one processor, to cause the apparatus to at least classify recorded data according to an event type, wherein the recorded data may comprise a plurality of modalities. The at least one memory and stored computer program code are further configured, with the at least one processor, to cause the apparatus to select an event template based on the event type, wherein the event template comprises a set of event-specific image templates, detect one or more predefined objects or one or more predefined events in the recorded data in accordance with the event template, create a remix video utilizing the event template and the one or more predefined objects or the one or more predefined events, and causing presentation of the remix video. The at least one memory and stored computer program code are further configured, with the at least one processor, to cause the apparatus to estimate a quality level of each input data modality, extract one or more features from one or more of the plurality of data modalities, classify the one or more extracted features, perform relation analysis for discovering correlative relations, anti-correlative relations, or a combination thereof between the one or more extracted features, and perform fusion of feature classification using relation analysis results, quality levels of the input data modalities, location information, or a combination thereof to determine the event type. The event template may comprise information related to assigning roles to one or more recording devices, selecting a sub-set of editing rules, selecting a sub-set of potential salient events, and selecting a sub-set of potential salient objects. The fusion may be performed by majority voting, non-weighted average, weighted average, or using an additional classifier. The at least one memory and stored computer program code are further configured, with the at least one processor, to cause the apparatus to assign roles for one or more recording devices, according to the event type template, to record one or more potential salient events or one or more potential salient objects. The assigning of roles is a function of one or more of a number of recording devices, a capability of the recording devices, preference information of a person associated with the event, preference information of a person associated with the remix video.

The at least one memory and stored computer program code are further configured, with the at least one processor, to cause the apparatus to detect the predefined object in the recorded data by selecting a sub-set of image templates and performing template matching. The at least one memory and stored computer program code are further configured, with the at least one processor, to cause the apparatus to select the sub-set of image templates wherein the selecting of the sub-set image templates further comprises matching the auxiliary sensor data from the recorded data with auxiliary data associated to available templates. The auxiliary sensor data may be compass data, accelerometer data, gyroscope data, location information, or a combination thereof. Selecting of the sub-set of image templates by selecting templates with a highest score in an instance in which a difference between the auxiliary data of the recorded data and one of the templates is less than a predetermined threshold, wherein selecting of the sub-set of image templates further comprises analyzing auxiliary sensor data captured in the recorded data and utilizing an offline phase and an online phase, wherein the offline phase comprises collecting a set of multimodal templates, and causing image templates and associated metadata information to be stored, wherein the associated metadata information is auxiliary sensor data, and wherein the online phase comprises template matching on the recorded data. The at least one memory and stored computer program code are further configured, with the at least one processor, to cause the apparatus to perform template matching by extracting features from the sub-set of image templates, extracting features from the recorded data, and matching the extracted features.

In a further embodiment, a computer program product is provided that includes at least one non-transitory computer-readable storage medium having computer-readable program instructions stored therein, the computer-readable program instructions includes program instructions configured to classify recorded data according to an event type, wherein the recorded data may comprise a plurality of modalities. The computer-readable program instructions also include program instructions configured to select an event template based on the event type, wherein the event template comprises a set of event-specific image templates, detect one or more predefined objects or one or more predefined events in the recorded data in accordance with the event template, and create a remix video utilizing the event template and the one or more predefined objects or the one or more predefined events. In another embodiment, the program instructions are configured for causing presentation of the remix video. The computer-readable program instructions also include program instructions configured for estimating a quality level of each input data modality, extracting one or more features from one or more of the plurality of data modalities, classifying the one or more extracted features, performing relation analysis for discovering correlative relations, anti-correlative relations, or a combination thereof between the one or more extracted features, and performing fusion of feature classification using relation analysis results, quality levels of the input data modalities, location information, or a combination thereof to determine the event type. The event template may comprise information related to assigning roles to one or more recording devices, selecting a sub-set of editing rules, selecting a sub-set of potential salient events, and selecting a sub-set of potential salient objects. The fusion may be performed by majority voting, non-weighted average, weighted average, or using an additional classifier. The computer-readable program instructions also include program instructions configured to assign roles for one or more recording devices, according to the event type template, to record one or more potential salient events or one or more potential salient objects. The assigning of roles is a function of one or more of a number of recording devices, a capability of the recording devices, preference information of a person associated with the event, preference information of a person associated with the remix video.

The computer-readable program instructions also include program instructions configured to detect the predefined object in the recorded data by selecting a sub-set of image templates and performing template matching. The computer-readable program instructions also include program instructions wherein the selecting of the sub-set of image templates further comprises matching the auxiliary sensor data from the recorded data with auxiliary data associated to available templates. The auxiliary sensor data may be compass data, accelerometer data, gyroscope data, location information, or a combination thereof. Selecting of the sub-set of image templates by selecting templates with a highest score in an instance in which a difference between the auxiliary data of the recorded data and one of the templates is less than a predetermined threshold, wherein selecting of the sub-set of image templates further comprises analyzing auxiliary sensor data captured in the recorded data and utilizing an offline phase and an online phase, wherein the offline phase comprises collecting a set of multimodal templates, and causing image templates and associated metadata information to be stored, wherein the associated metadata information is auxiliary sensor data, and wherein the online phase comprises template matching on the recorded data. The computer-readable program instructions also include program instructions configured to perform template matching by extracting features from the sub-set of image templates, extracting features from the recorded data, and matching the extracted features.

One example apparatus may include means for classifying recorded data according to an event type. The recorded data may comprise a plurality of modalities. The apparatus may also include means for selecting an event template based on the event type. The apparatus may also include means for detecting one or more predefined objects or one or more predefined events in the recorded data in accordance with the event template. The apparatus may also include means for creating a remix video utilizing the event template and the one or more predefined objects or the one or more predefined events and causing presentation of the remix video.

The classifying of the recorded data according to the event type may comprise estimating a quality level of each input data modality, extracting one or more features from one or more of the plurality of data modalities, classifying the one or more extracted features, performing relation analysis for discovering correlative relation, anti-correlative relations, or a combination thereof between features, and performing fusion of feature classification using relation analysis results, quality levels of the input data modalities, location information, or a combination thereof to determine the event type. The event template may comprise information related to assigning roles to one or more recording devices, selecting a sub-set of editing rules, selecting a sub-set of potential salient events, and selecting a sub-set of potential salient objects. The fusion may be performed by majority voting, non-weighted average, weighted average, or using an additional classifier. The apparatus may also include means for assigning roles for one or more recording devices, according to the event type template, to record one or more potential salient events or one or more potential salient objects.

The assigning of roles is a function of one or more of a number of recording devices, a capability of the recording devices, preference information of a person associated with the event, preference information of a person associated with the remix video. The detecting of the predefined object in the recorded data may comprise selecting a sub-set of image templates and performing template matching. Selecting of the sub-set of image templates further comprises matching the auxiliary sensor data from the recorded data with auxiliary data associated to available templates. The auxiliary sensor data may be compass data, accelerometer data, gyroscope data, location information, or a combination thereof. Selecting of the sub-set of image templates further comprises selecting templates with a highest score in an instance in which a difference between the auxiliary data of the recorded data and one of the templates is less than a predetermined threshold, wherein selecting of the sub-set of image templates further comprises analyzing auxiliary sensor data captured in the recorded data, and utilizing an offline phase and an online phase, wherein the offline phase comprises collecting a set of multimodal templates, and storing image templates and associated metadata information, wherein the associated metadata information is auxiliary sensor data, and wherein the online phase comprises template matching on the recorded data. Template matching may further comprise extracting features from the sub-set of image templates, extracting features from the recorded data, and matching the extracted features.

BRIEF DESCRIPTION OF THE DRAWINGS

Figure 1:
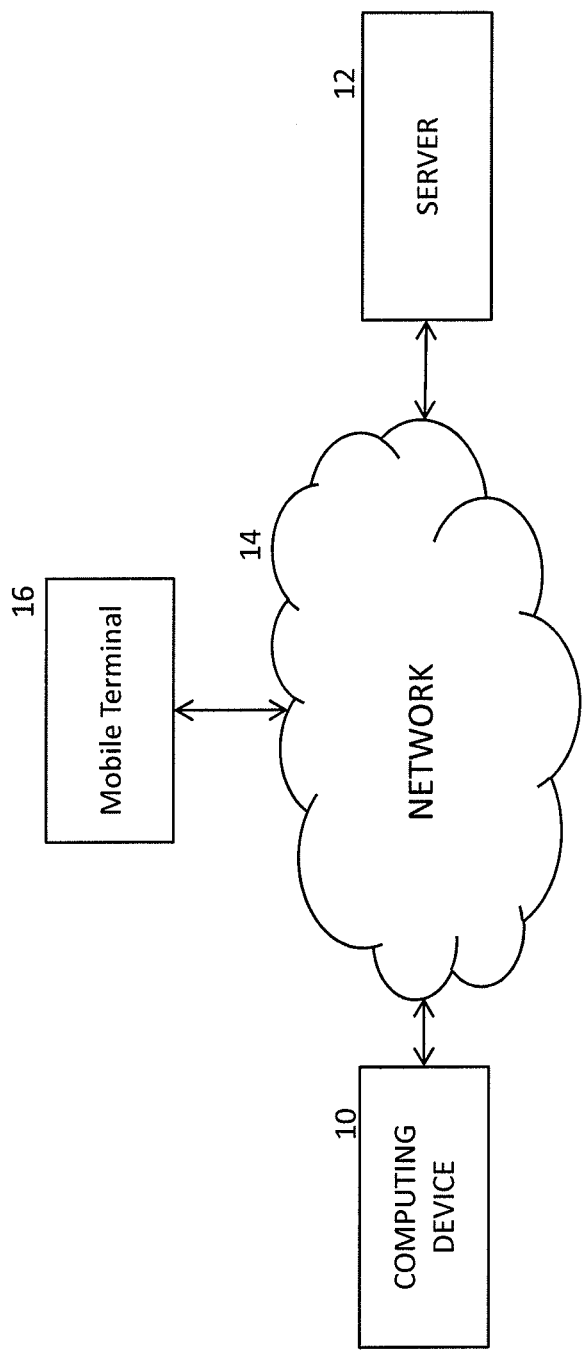
Figure 2:
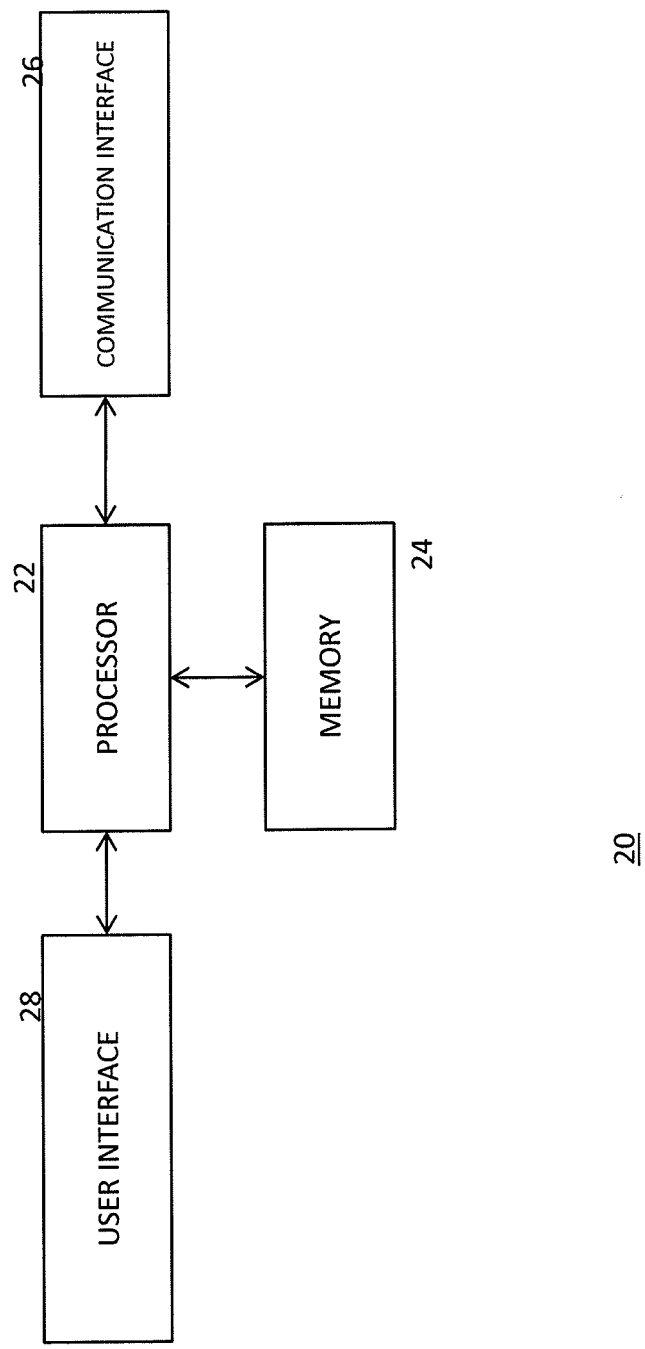
Figure 3:
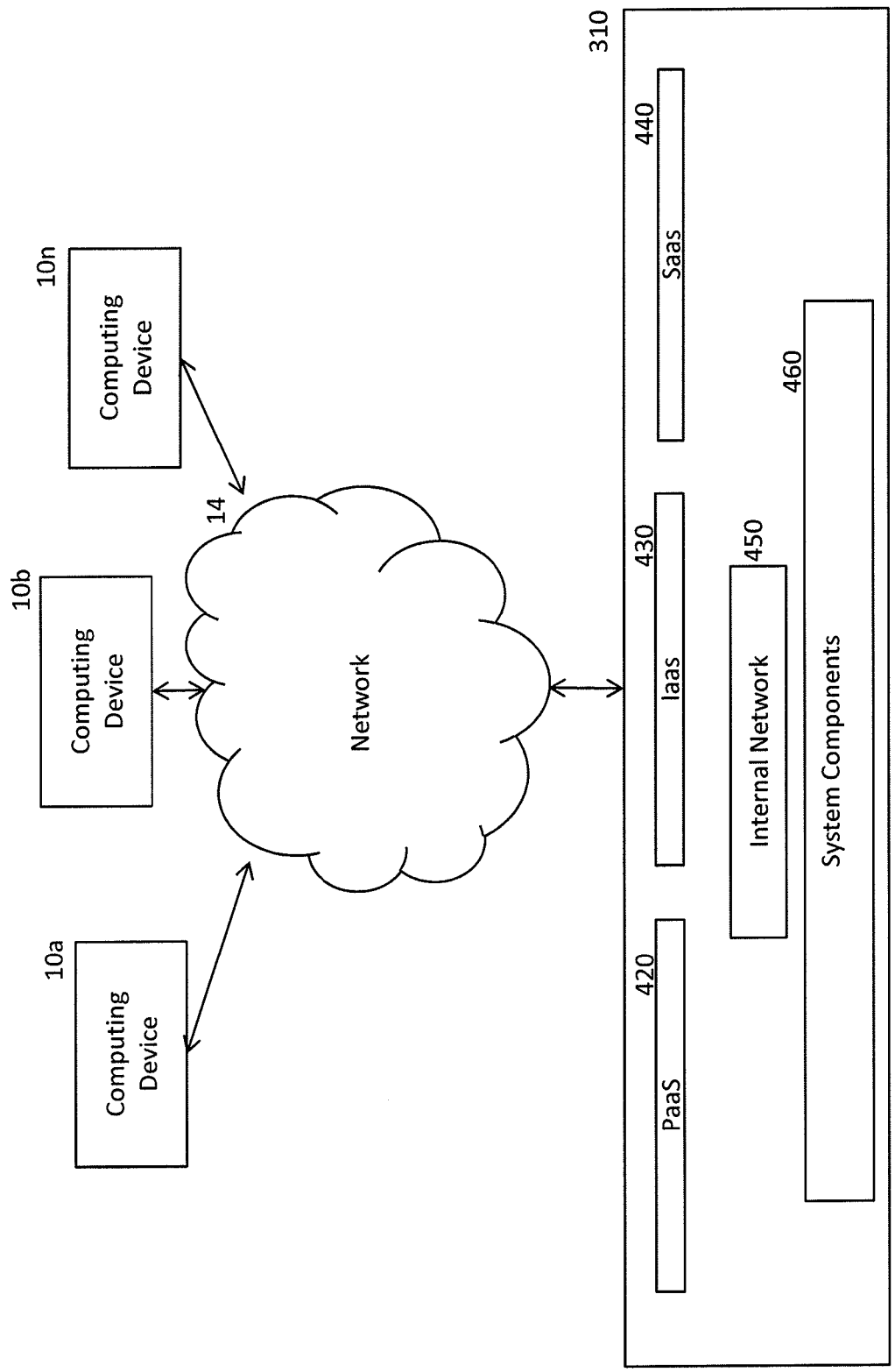

Having thus described embodiments of the invention in general terms, reference will now be made to the accompanying drawings, which are not necessarily drawn to scale, and wherein:

FIG. 1 is block diagram of a system that may be specifically configured in accordance with an example embodiment of the present invention;

FIG. 2 is a block diagram of an apparatus that may be specifically configured in accordance with an example embodiment of the present invention;

FIG. 3 is a schematic representation of a system that may support communications, such as computing, between a cloud computing system and a computing device.

Figure 4:
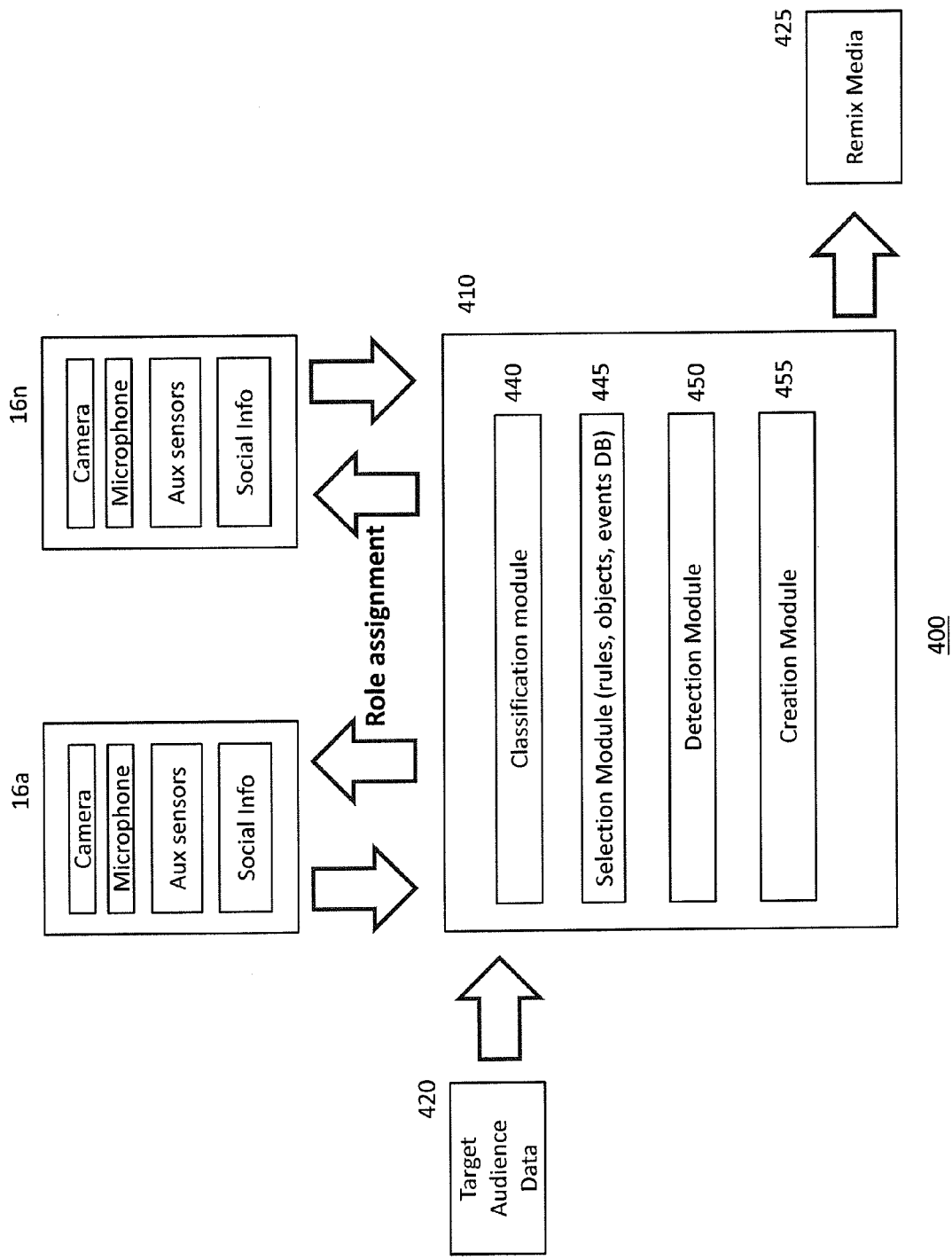
Figure 5:
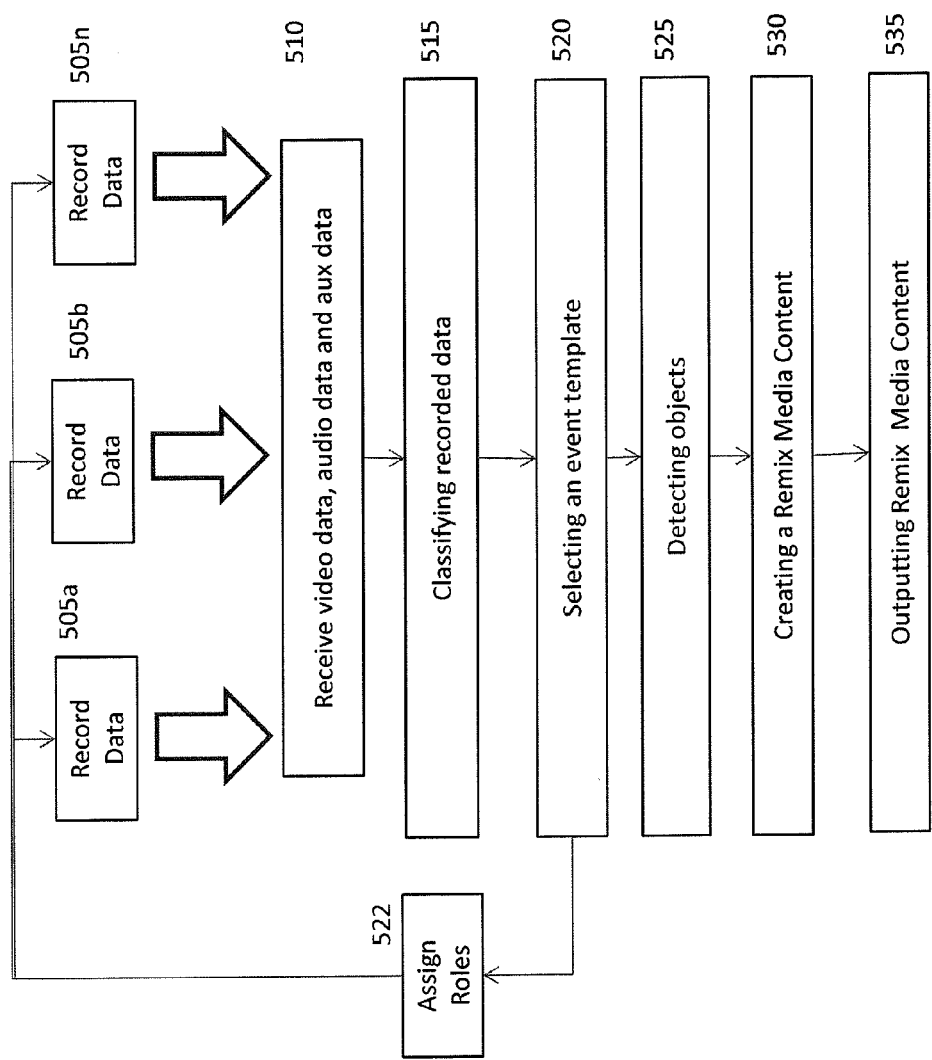
Figure 6:
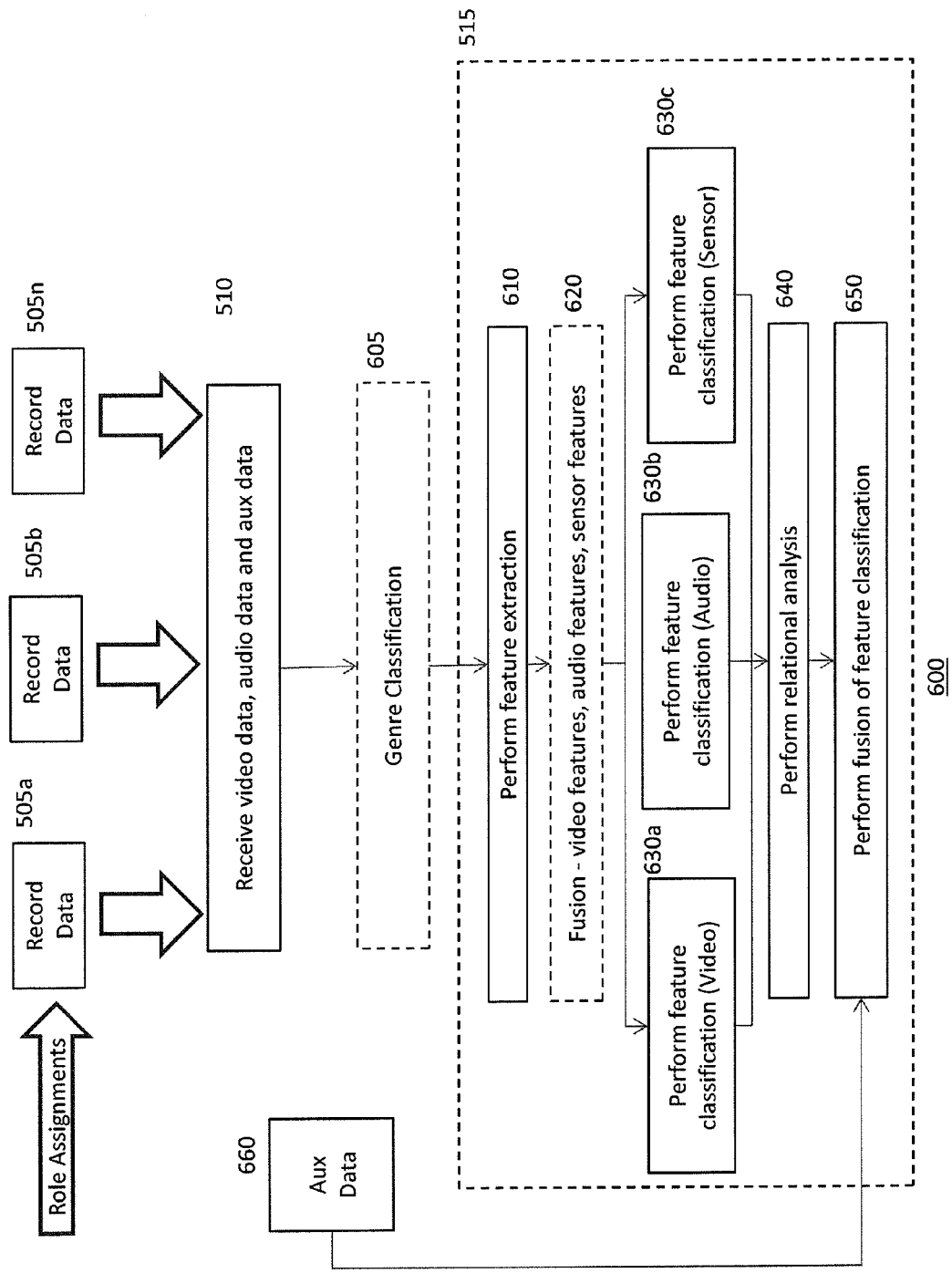
Figure 7:
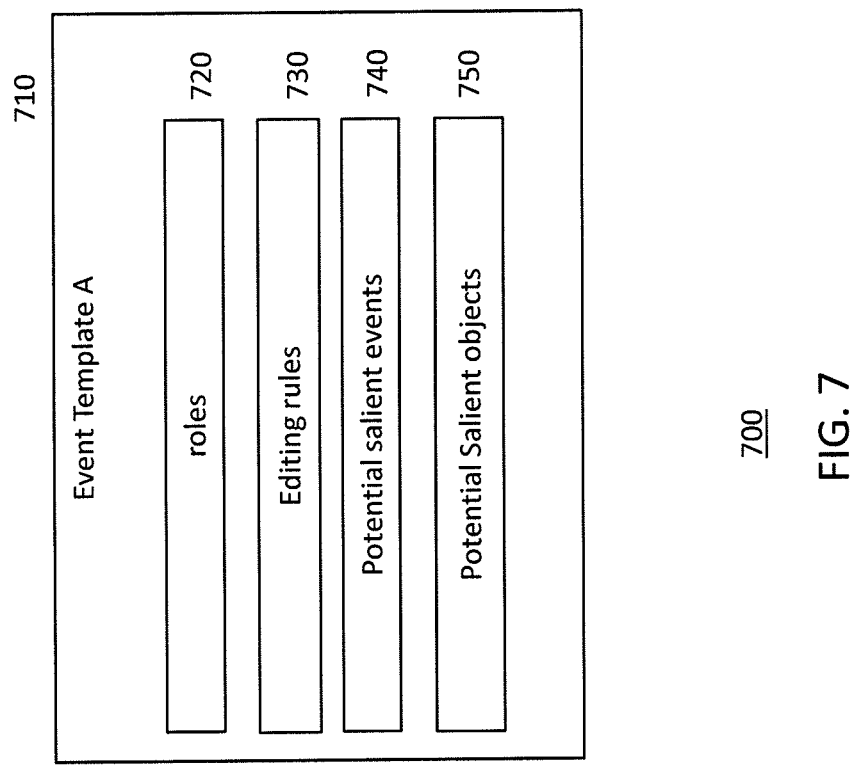
Figure 8:
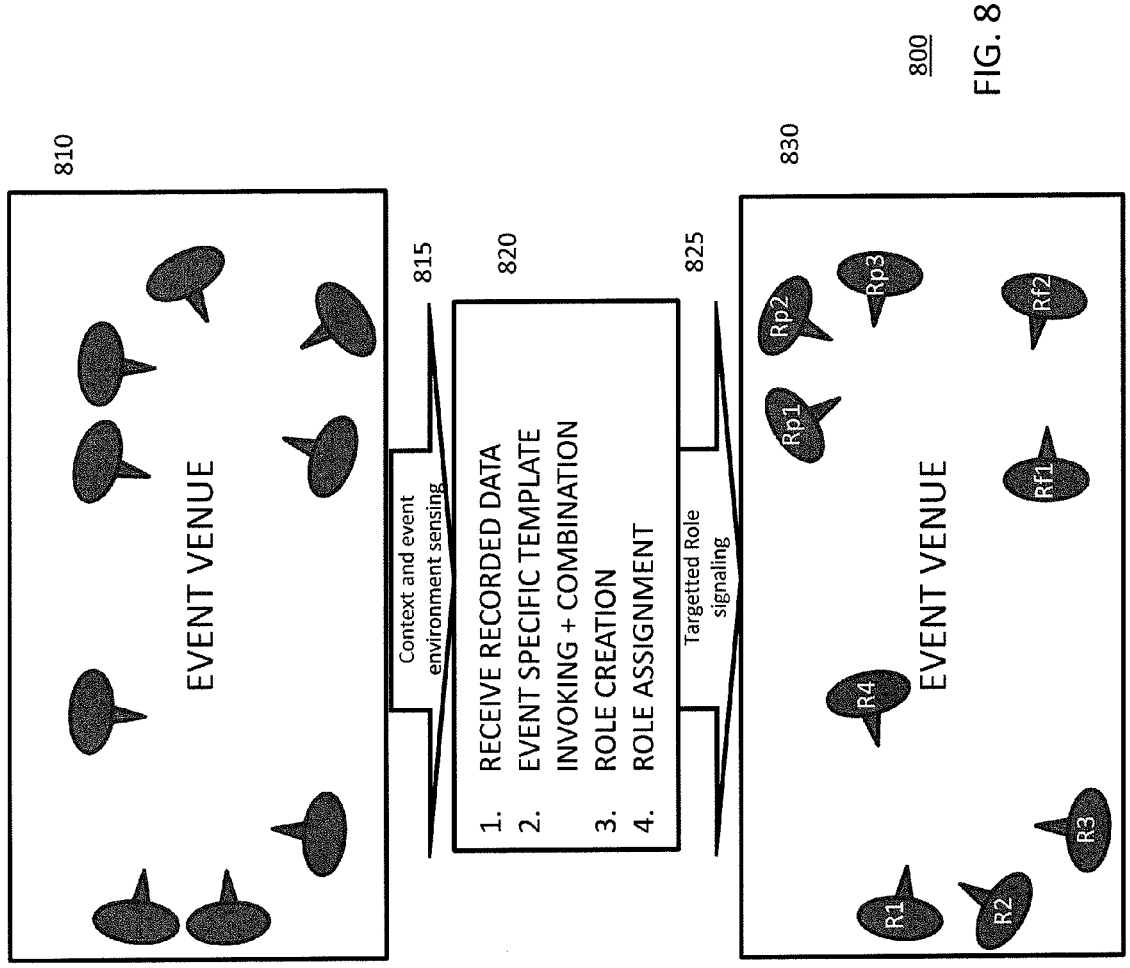

FIG. 4 is a flow chart illustrating operations performed, such as by the apparatus of FIG. 2, in accordance with an example embodiment of the present invention;

FIG. 5 is a flow chart illustrating operations performed, such as by the apparatus of FIG. 2, in accordance with an example embodiment of the present invention; and FIG. 6 is a flow chart illustrating operations performed, such as by the apparatus of FIG. 2, in accordance with an example embodiment of the present invention;

FIG. 7 is an example block diagram of an example event template for practicing embodiments of a media content processing system; and FIG. 8 is an example flowchart illustrating a method of creating and assigning roles in accordance with an embodiment of the present invention.

Figure 9:
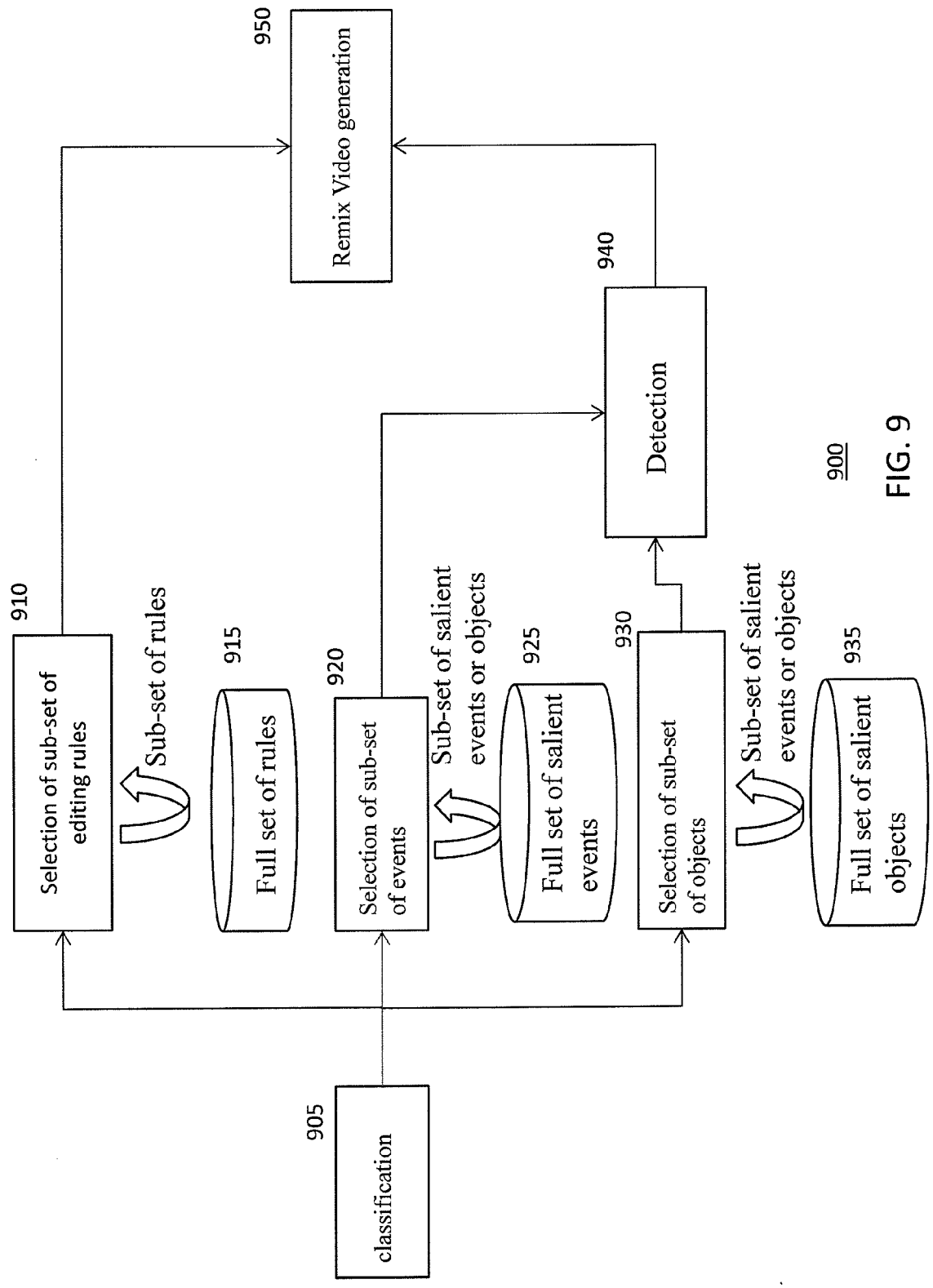

FIG. 9 is an example flowchart illustrating a method of rule, object and event detection in accordance with an embodiment of the present invention.

Figure 10:
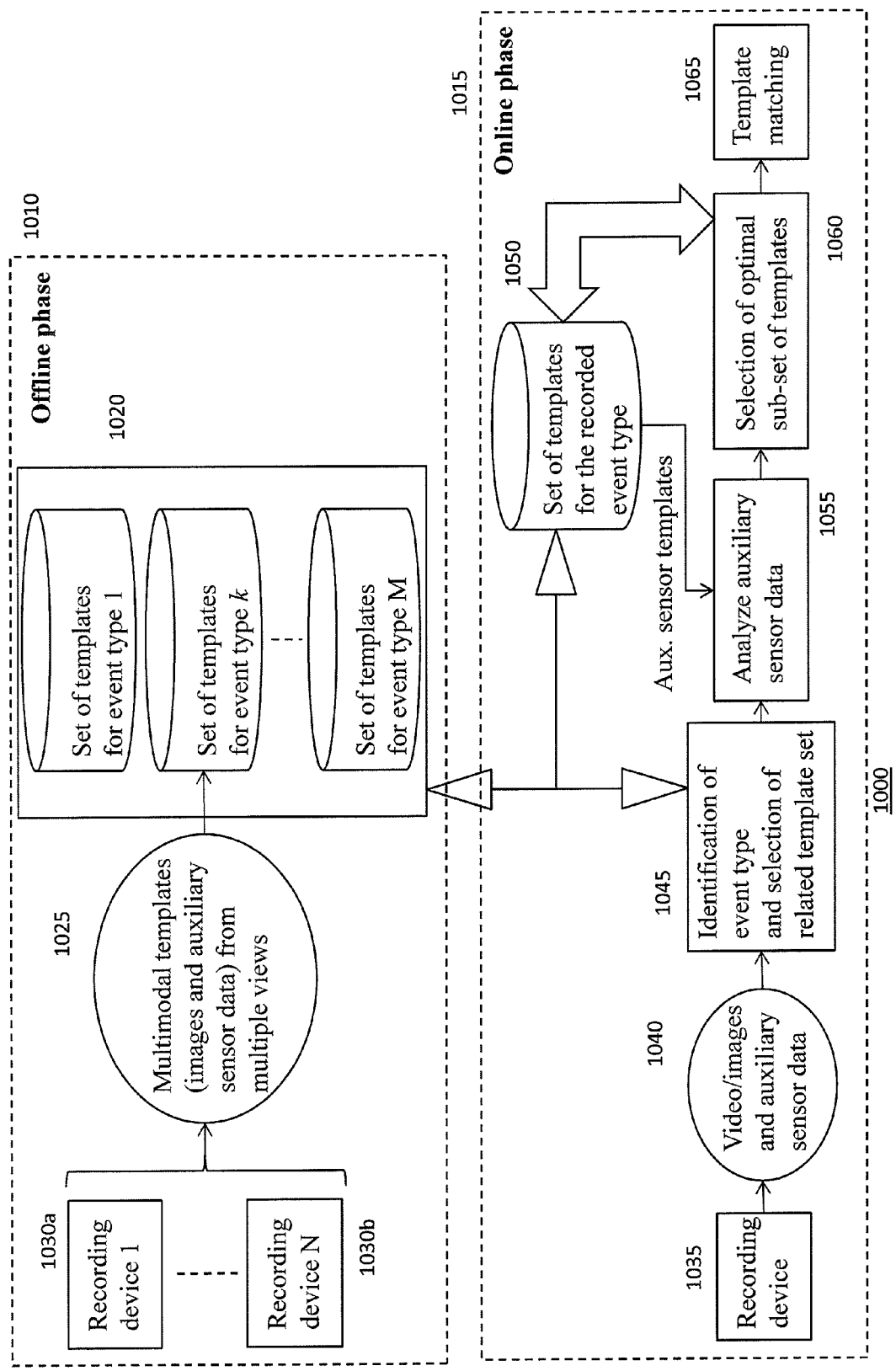

FIG. 10 is an example flowchart illustrating a method of object detection performed in accordance with an embodiment of the present invention.

DETAILED DESCRIPTION

Some example embodiments will now be described more fully hereinafter with reference to the accompanying drawings, in which some, but not all embodiments are shown. Indeed, the example embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

Referring now of FIG. 1, a system that supports communication, either wirelessly or via a wireline, between a computing device 10 and a server 12 or other network entity (hereinafter generically referenced as a "server") and mobile terminal 16 is illustrated. As shown, the computing device, the server, and the mobile terminal 16 may be in communication via a network 14, such as a wide area network, such as a cellular network or the Internet or a local area network. However, the computing device, the server, and the mobile terminal may be in communication in other manners, such as via direct communications between the computing device and the server.

The computing device 10 may be embodied by a number of different devices including mobile computing devices, such as a personal digital assistant (PDA), mobile telephone, smartphone, laptop computer, tablet computer, or any combination of the aforementioned, and other types of voice and text communications systems. Alternatively, the computing device may be a fixed computing device, such as a personal computer, a computer workstation or the like. The server 12 may also be embodied by a computing device and, in one embodiment, is embodied by a web server. Additionally, while the system of FIG. 1 depicts a single server and a single mobile terminal, the server may be comprised of a plurality of servers which may collaborate to support browsing activity conducted by the computing device. The system may support a plurality of mobile terminals such as personal digital assistants (PDA), mobile telephones, smartphones, laptop computers, tablet computers, or any combination of the aforementioned, and other types of voice and text communications systems, and each may comprise video, audio and sensor recording capabilities.

Regardless of the type of device that embodies the computing device 10, the computing device may include or be associated with an apparatus 20 as shown in FIG. 2. In this regard, the apparatus may include or otherwise be in communication with a processor 22, a memory device 24, a communication interface 26 and a user interface 28. It should be noted that while FIG. 4 illustrates one example of a configuration of an apparatus, numerous other configurations may also be used to implement embodiments of the present invention. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 22 (and/or co-processors or any other processing circuitry assisting or otherwise associated with the processor) may be in communication with the memory device 24 via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus 20 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a computing device 10 configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, in an instance in which the processor is embodied as an ASIC, FPGA or the like, the processor may be specifically configured hardware for conducting the operations described herein. Alternatively, as another example, in an instance in which the processor is embodied as an executor of software instructions, the instructions may specifically configure the processor to perform the algorithms and/or operations described herein when the instructions are executed. However, in some cases, the processor may be a processor of a specific device (e.g., a head mounted display) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In one embodiment, the processor may also include user interface circuitry configured to control at least some functions of one or more elements of the user interface 28.

Meanwhile, the communication interface 26 may be any means such as a device or circuitry embodied in either hardware or a combination of hardware and software that is configured to receive and/or transmit data between the computing device 10 and a server 12. In this regard, the communication interface 26 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly with the head mounted displays, such as via Wi-Fi, Bluetooth or other wireless communications techniques. In some instances, the communication interface may alternatively or also support wired communication. As such, for example, the communication interface may include a communication modem and/or other hardware/software for supporting communication via cable, digital subscriber line (DSL), universal serial bus (USB) or other mechanisms. For example, the communication interface may be configured to communicate via wired communication with other components of the computing device.

The user interface 28 may be in communication with the processor 22, such as the user interface circuitry, to receive an indication of a user input and/or to provide an audible, visual, mechanical, or other output to a user. As such, the user interface may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. The user interface may also be in communication with the memory 24 and/or the communication interface 26, such as via a bus.

Apparatus 20 may be embodied by any of computing device 10a, 10b, or 10n configured to employ an example embodiment of the present invention. Furthermore, apparatus 20 may be embodied to employ system 300. As depicted in FIG. 3, system 300 shows computing devices 10a, 10b, and 10n coupled to a cloud computing system 310 via network 14. In order to access information accessible from could cloud computing system 310, a browser application may run on computing devices 10a, 10b, and 10n. Browser may be configured to run within a local operating system of computing device 10. Non-limiting examples of known browser applications include Microsoft Explorer™, Apple Safari™, Mozilla™, Firefox™ and Google Chrome™ browser. Non-limiting examples of known operating systems for desktop and/or laptop computers may include Microsoft Vista™, Apple Snow Leopard™, or Linux. Examples of known operating systems for mobile devices (e.g., smartphones, netbooks, etc.) include Microsoft Windows Mobile®, Apple Iphone OS®, and Google Android™ mobile technology platform.

The browser may enable a user to manipulate access to information accessible via network 14. For example, browser may provide a user with an ability to enter one or more uniform resource indicators (URIs, e.g., www.google.com) in order to access a web application, such as, for example, a hypertext markup language (HTML) document, or a privileged web application. A web application, and/or information used by a web application, may be stored on Cloud computing system 310. Browser may be configured to access web applications and/or other information stored on cloud computing system 310 for presentation of visual information to a user of computing device 10, among other uses. A web application, or any HTML5 or JavaScript™ application or "app", is a computer software application that is coded in a browser-supported programming language (such as JavaScript™, combined with a browser-rendered markup language like HTML5, reliant on a common web browser to render the application executable). The opening of a web page or "app" may be performed by a web browser on a user's mobile communications device 10. An HTML5 or JavaScript™ "app" allows web page script to contact a server 12, such as that shown in FIG. 1, items 12, or the cloud computing environment 310 for storing and retrieving data without the need to re-download an entire web page. A privileged web app is a piece of web content that may have been verified by, for example, means of an app store or stores or may have obtained or downloaded from a source that is trusted source.

The system 300 includes computing devices 10a, 10b, and 10n connected to a network 14 such as, for example, a Transport Control Protocol/Internet Protocol (TCP/IP) network (e.g., the Internet.) The computing devices 10a, 10b, and 10n are coupled to the cloud computing system 310. Depending on the type of cloud service provided, a computing device 10 may connect to one of three service endpoints, each of which give varying amounts of control relative to the provisioning of resources within the cloud computing system 310. For example, PaaS 320 will typically give an abstract Application Programming Interface (API) that allows developers to declaratively request or command the backend storage, computation, and scaling resources provided by the cloud, without giving exact control to the user. IaaS 330 will typically provide the ability to directly request the provisioning of resources, such as computation units (typically virtual machines), software-defined or software-controlled network elements like routers, switches, domain name servers, etc., file or object storage facilities, authorization services, database services, queue services and endpoints, etc. SaaS 340 will typically only give information and access relative to the application running on the cloud storage system, and the scaling and processing aspects of the cloud computing system will be obscured from the user.

Furthermore, a cloud computing system 310 may have an internal network 350 not visible to the outside that connect to system components 360. System components may include a memory system including system memory and user memory, processor(s), routers, switches, a message passing system, one or more service controllers, a system controller, etc. The internal network 350 may be encrypted or authenticated and in various embodiments, one or more parts of the cloud computing system 310 may be disposed on a single host.

Cloud APIs are application programming interfaces (APIs) used to build applications in the cloud computing market. Cloud APIs allow software to request data and computations from one or more services through a direct or indirect interface. Cloud APIs most commonly expose their features via representational state transfer (REST) and/or Simple Object Access Protocol (SOAP). Vendor specific and cross-platform interfaces are available for specific functions. Cross-platform interfaces have the advantage of allowing applications to access services from multiple providers without rewriting, but may have less functionality or other limitations versus vendor-specific solutions. Cloud APIs may be segmented into infrastructure, service and application clusters. Service APIs provide an interface into a specific capability provided by a service explicitly created to enable that capability. Database, messaging, web portals, mapping, e-commerce and storage are all examples of service APIs. These services may be referred to as platform as a service (PaaS).

Platform as a service (PaaS) is a category of cloud computing services that provide a computing platform and a solution stack as a service. Along with Application as a Service (SaaS) and Infrastructure as a Service (IaaS), it is a service model of cloud computing. In this model, the consumer creates the software using tools and/or libraries from the provider. The consumer also controls software deployment and configuration settings. The provider provides the networks, servers, storage and other services. PaaS offerings may also include facilities for application design, application development, testing and deployment as well as services such as team collaboration, web service integration and marshaling, database integration, security, scalability, storage, persistence, state management, application versioning, application instrumentation and developer community facilitation. These services are generally provisioned as an integrated solution over the web.

FIG. 4 is a schematic representation 400 of an example media content processing system 410 in accordance with an embodiment of the present invention. Apparatus 20 may be embodied by media content processing system 410 configured to employ an example embodiment of the present invention. In particular the media content processing system 410 may be configured to receive a plurality of media content (e.g. audio records, video segments, photographs and/or the like) from one or more mobile terminals 16a and 16n. The received media content may be linked, classified and/or somehow associated with a particular, or predefined, public event (e.g. private performance, theater, sporting event, concert and/or the like) and/or the received media content may alternatively be unlabeled or unclassified. The received media content may also include sensor data (e.g. data captured by a visual sensor, an audio sensor, a compass, an accelerometer, a gyroscope or a global positioning system receiver) that was captured at the time the media content were captured, however in some embodiments the sensor data may also be received separately.

In some example embodiments, the mobile terminals 16a and 16n may be a mobile communication devices such as, for example, a mobile telephone, portable digital assistant (PDA), pager, laptop computer, or any of numerous other hand held or portable communication devices, computation devices, content generation devices, content consumption devices, or combinations thereof. As such, the mobile terminal may include one or more processors that may define processing circuitry either alone or in combination with one or more memories. The processing circuitry may utilize instructions stored in the memory to cause the mobile terminal to operate in a particular way or execute specific functionality when the instructions are executed by the one or more processors. The mobile terminal may also include communication circuitry and corresponding hardware/software to enable communication with other devices and/or the network.

The media content processing system 410 may include a classification module 440, a selection module 445, and detection module, 450, and a creation module 455. The classification module 440 may be configured to discriminate events into type "sport" and "other". If the event is a sport event, the classification module 410 may further be configured to classify the event into sub-event or a sport genre, such as "baseball", "soccer", etc. Alternatively, if the event belongs to "other" class, the classification module may be configured to classify the event into a sub-event, such as "wedding", etc.

Furthermore, the classification module 440 may be configured to analyze each of the data modalities and extract a number of features. Such features are considered to be discriminative for event and sub-event classification and eventual event type template selection. The classification module may be further configured to determine an event-type classification of a media content event based on the received media content. In particular, the event type classification module 440 may be configured to determine a layout of the event, a genre of the event and a place of the event. Because the classification module 440 may be configured to analyze each of the data modalities and extract a number of features and because such features are considered to be discriminative for event and sub-event classification, event and sub-event may be used interchangeably.

The classification module 440 may be further configured to determine a layout of the event may include determining a type of venue where the event is occurring. In particular, the layout of the event may be classified as circular (e.g. stadium where there are seats surrounding an event) or uni-directional (e.g. proscenium stage). A place of the event may include a classification identifying whether the place of the event is indoors or outdoors. In some instances a global position system (GPS) lock may also be used. For example in an instance in which a GPS lock was not obtained that may indicate that the mobile terminal captured the media content event indoors.

In an embodiment, the classification module 440, may be further configured to utilize multimodal data (e.g. media content and/or sensor data) captured by a mobile terminal 16 during the public event. For example, multimodal data from a plurality of mobile terminals 16a-16n may increase the statistical reliability of the data. Further the classification module 440 may also determine more information about an event by analyzing multiple different views captured by the various mobile terminals 16-16n.

The classification module 440 may also be configured to extract a set of features from the received data modalities captured by recording devices such as the mobile terminals 16a-16n. The extracted features may then be used when the classification module 440 conducts a preliminary classification of at least a subset of these features. The results of this preliminary classification may represent additional features, which may be used for classifying the media content with respect to layout, event genre, place and/or the like. In order to determine the layout of an event location, a distribution of the cameras associated with mobile terminals 16-16n that record the event is determined. Such data enables the event type classification module 440 to determine whether the event is held in a circular like venue such as a stadium or a proscenium stage like venue. In particular, the classification module 440 may use the location of the mobile terminals 16a-16n that captured the event to understand the spatial distribution of the mobile terminals 16a-16n. The horizontal camera orientations may be used to determine a horizontal point pattern and the vertical camera orientations may be used to determine a vertical camera pointing pattern.

Alternatively or additionally the classification of the type of event are done in real time or near real time as the data (context and/or media) is continuously received. Each mobile device may be configured to send either the raw sensor data (visual, audio, compass, accelerometer, gyroscope, GPS, etc.) or features that can be extracted from such data regarding the media content recorded by only the considered device, such as average brightness of each recorded media content event, average brightness change rate of each recorded video.

Alternatively or additionally, the classification of the type of event may be partially resolved by each mobile terminal, without the need of uploading or transmitting any data (context or media) other than the final result, and then the collective results are weighted and/or analyzed by the classification module 440 for a final decision. In other words the classification module 440 may be located on the mobile terminal 10, or may alternatively be located on a remote server. Therefore each mobile device may perform part of the feature extraction (that does not involve knowledge about data captured by other devices), whereas the analysis of the features extracted by all mobile devices (or a subset of them) is done by the classification module 440.

Data modalities considered in this invention are those captured by the camera(s) (visual data), by the microphone(s) (audio data) and by auxiliary sensors such as electronic compass, accelerometer, gyroscope, Global Positioning System (GPS) receiver, Indoor Positioning sensor (including but not limited to neighborhood WiFi Access Points, Blue-Tooth IDs, etc) or any other suitable positioning method, etc. Also, we consider zoom level information to be part of the auxiliary sensor data because it can be signaled from the camera module to the computing unit (which performs the analysis) in the same way as other sensor data is signaled.

By analyzing each of these data modalities a number of features are extracted. In one embodiment of the present invention, a late fusion approach for fusing the different data modalities may be utilized. Additionally or alternatively, an early fusion strategy may be employed. Early fusion may be performed by combining the feature vectors from different data modalities before the classification step for instance by simply concatenating the feature vectors into one longer feature vector. The features extracted from each data modality are then fed into one (in the simplest case) or more classifiers. Thus, in the simplest case, there is one classifier for each data modality. The classification results obtained from the different classifiers are then fused in order to obtain the final sport-genre classification result, which is a label indicating the specific sport-genre (i.e., the type of sport, such as "soccer", "baseball", etc.).

The selection module 445 may be configured to select an event type template based on the classification results. The appropriate event type template may comprise information about the corresponding event type. The event type template may be used for the following tasks: (1) assigning roles to the people who are recording; (2) selecting the appropriate set of editing rules; (3) selecting the appropriate set of salient events; and (4) selecting the appropriate set of salient objects.

In another embodiment, the selection module 445 may be configured to select an event type template for events which have been classified as "other" (i.e. not sport) using one or more of the following information: participating users' personal profile which may provide information about his/her current residence, religious orientation, cultural affiliations, social interests, professional interests, age, family information, etc.; participating users' personal calendar; demographic information about the social network connections (for example, mother tongue, religious orientation, cultural affiliations, social groups, professional groups, financial interests, etc.) of the participating users.

In another embodiment, to determine an event type template, the selection module 445 may be further configured for sensing of the recording environment to detect one or more of the following: spoken Language detected in the event location; key words corresponding to certain event types detected by one or more users' recording device(s); typical music corresponding to certain event types detected by one or more users' recording device(s); detection of typical objects of interest (OOI) in the content recorded by one or more users; detection of temperature gradient (ex. Using IR sensors) to determine a ceremonial fire, etc.; and presence of certain animals.

Based on the selected event type template, the system may assign roles to the people recording the event that accomplish capture of subjects of interest, objects of interest, and scenes or concepts of interest. In one embodiment, subjects of interest may consist of one or more people in the event important for generating a composition of high value. For example, the bride and groom may be the most important subjects that must be captured in visual as well as audio modality. Some other subjects may be captured in only one modality, for example a musician playing some instrument during the wedding. A high quality audio rendering of the instrument may be of more value than his/her video or image. Objects of interest in the event may consist of one or more objects that are important and/or peculiar to the event. The objects may be from different modalities. Some examples of OOI may include smoke around the ceremonial fire, a ceremonial altar in the wedding, a specific set of spoken words, a specific set of songs, a specific set of music snippets. Scenes or concepts of interest in the event, important and/or peculiar to the event may refer to a sequence of appearance (in series as well as parallel) of objects of interest and/or a duration of appearances of objects of interest.

The capture criteria may be prioritized based on the following: the number of recording participants at the event, the capabilities of the recording devices available with the recording participants, a preference set of the person owning the event, a preference set of the person requesting the composition for the event.

The created roles may be signaled to the recording participants based on recorded content from the users from the event. Subsequently a remix is generated using the content captured that is in accordance of the roles. The roles themselves may be generated specifically for the event by selecting the event type template according to the obtained event type or label about the event type.

In one embodiment, the obtained label about the event type may then be used for selecting the appropriate set of cinematographic/video-editing tools to be used in creating the final remix video. Examples of cinematographic/video-editing rules may include using specific video-transition types, having video segments (constituting the final remix video) of specific durations, using particular, or predefined, sequence-patterns for shot-sizes (i.e., one long-shot followed by two close-ups), etc.

Additionally or alternatively, the obtained label about the event type may then be used to select a sub-set of potential salient events that may occur in the input videos depending on the detected sport-genre. Examples of salient events are "scoring of a goal in soccer", "service hit in tennis", "scoring of a point in volleyball", etc.

In addition to the event nuances detected from the previous steps, the selection module may be configured to incorporate the requirements of the target audience into the determination of the event type template. For example, target audience could be either work colleagues or family. An exemplary, non-limiting example of incorporated target audience preference in the selection process may include a higher percentage of content from the actual wedding ceremony and close relatives attending a wedding in an instance in which a target audience is family, opposed to the post wedding party or parts consisting of non-family guests.

The detection module 450 may be configured to detect a presence of specific objects (e.g., objects of interest) in a recorded scene. Once the event type is known (e.g. soccer), the detection module 450 may be configured to select a sub-set of image templates and to perform template matching in order to detect a predefined object in an input image or video. In one embodiment, an optimal sub-set of image templates are selected. The optimal sub-set of image templates is selected based on auxiliary sensor data which is captured by the recording device (e.g., a mobile phone) during the video recording process. An image template that may be considered for the optimal sub-set of image templates may be determined based on matching the sensor data from the recoded sensor data with the sensor data from one of the image templates from the full set of image templates and determining which of a plurality of image templates most closely matches one or more features from the recorded data. The detection module 450 may be further configured to target videos recorded during events that are likely to consist of a fixed (or static) geometrical structure; in particular, the possible relative positions between the recording devices and the object of interest may be fixed and/or not changing (or only slightly changing).

The detection module 450 may be configured to perform a detection method comprising two phases: an offline phase and an online phase. During the offline phase, for each type of event, a set of multimodal templates (i.e. template images which may be enriched with compass data) is collected by capturing and storing both image templates and associated metadata information. Such metadata may be the auxiliary sensor data, which will be explained in more detail. In the online phase, the detection module may be configured to receive input video, image, audio, or sensor data from the recording device(s) on which template matching may be performed.

Furthermore, the detection module 450 may be configured for template matching. In one embodiment, template matching may consider only the optimal sub-set of image templates (instead of the full set). The detection module may be configured to determine or obtain the optimal sub-set of image templates. Furthermore, the detection module may be configured to determine the optimal sub-set of image templates by analyzing the auxiliary sensor data associated to the input image and matching the auxiliary sensor data with the auxiliary sensor data associated to all available templates. In another embodiment of the invention, instead of performing exhaustive search, the detection module may be configured to detect a difference between the auxiliary sensor data of the input image and one of the templates and in an instance in which the difference between the auxiliary sensor data of the input image and the one of a template is less than a threshold, stop the search. The matches with highest score will indicate which templates are the most likely to be the correct ones.

The detection module 450 may be further configured to divide the image into sub-windows and then to analyze each sub-image to detect the presence/absence of the object of interest. The analysis step is performed in a different way depending on the adopted approach.

The detection module 450 may be configured to utilize template-based matching in the detection of objects of interest. Template-based matching may comprise a technique using a predefined template of the object in order to perform matching between each sub-window and the template. The sub-window which yields the match with the highest score is considered to contain the object. Usually a set of various predefined templates is used instead of a single template, where each template has different rotation, scale and illumination; in this way it is possible to cope respectively with rotation, scale and illumination variance. For each sub-window, the template that yields the highest score is chosen. The actual matching is performed between local features (interest key points such as Scale-Invariant Feature Transform—SIFT) extracted from both the sub-window and the template. For example, if we want to detect the presence of a goalmouth in a video of a soccer game, we would need to have a set of template images where each contains a goalmouth in a different rotation, scale or illumination; then we need to perform a matching between each of these templates and each sub-window of the video frames.

The detection module 450 may be configured to utilize classification-based detection in the detection of objects of interest. Classification-based matching may comprise a technique based on supervised learning approaches: a model of the object is obtained by training a classifier using a set of training images, i.e., images containing the object of interest. One extension to this approach is to consider an object as a combination of its parts and thus to learn models of these parts. In practice a set of "part classifiers" is used, where each classifier is trained on a single part of the object. For example, if we want to detect the presence of a goalmouth in a video sequence of a soccer game, in the training phase (performed offline) we would need to train a classifier (e.g., a Support Vector Machine) by providing it with many positive images (which contain the object) and negative images (which do not contain the object). In the classification phase (online phase) the recorded video is given as input to the classifier and by using the previously trained model it detects the presence of absence of the goalmouth object.

The creation module 455 may be configured to generate a remix video using the content captured that is in accordance with the roles. The creation module may be further configured to create a remix video utilizing recorded video received before and/or after roles are assigned, the detected objects of interest, the detected events of interest, preferences etc.

Furthermore, in example block diagram 400 of an example computing device for practicing embodiments of a media content event processing system shown in FIG. 4, system 300 may be utilized to implement the media content processing system 410. Note that one or more general purpose or special purpose computing systems/devices may be used to implement the media content processing system 410. In addition, the system 300 may comprise one or more distinct computing systems/devices and may span distributed locations. Furthermore, each block shown may represent one or more such blocks as appropriate to a specific embodiment or may be combined with other blocks. In other example embodiments, the modules 440, 445, 450, and 455 may be configured to operate on separate systems (e.g. a mobile terminal and a remote server, multiple remote servers and/or the like). For example, the classification module 440 and/or the selection module 445 may be configured to operate on a computing device 10a. Also, the media content processing system 300 may be implemented in software, hardware, firmware, or in some combination to achieve the capabilities described herein.

While the system may be employed, for example, by a mobile terminal 10, stand-alone system (e.g. remote server), it should be noted that the components, devices or elements described below may not be mandatory and thus some may be omitted in certain embodiments. Additionally, some embodiments may include further or different components, devices or elements beyond those shown and described herein.

FIG. 5 is a flow chart illustrating operations performed, such as by the apparatus 20 of FIG. 2 or apparatus 410 of FIG. 4, in accordance with an example embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 26 of an apparatus employing an embodiment of the present invention and executed by a processor 24 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIG. 8, when executed, convert a computer or processing circuitry into a particular machine configured to perform an example embodiment of the present invention. Accordingly, the operations of FIG. 5 define an algorithm for configuring a computer or processing to perform an example embodiment. In some cases, a general purpose computer may be provided with an instance of the processor which performs the algorithms of FIG. 5 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included. It should be appreciated that each of the modifications, optional additions or amplifications below may be included with the operations above either alone or in combination with any others among the features described herein.

FIG. 5 shows a flow chart illustrating operations performed, such as by the apparatus 20 of FIG. 2, system 300 of FIG. 3, or apparatus 410 of FIG. 4, in accordance with an example embodiment of the present invention.

In one embodiment of the present invention, as shown in operation 505a, 505b, and 505n, the apparatus 20, apparatus 410 or system 300 may include means for recording data. The recorded data may comprise video data, picture data, audio data, and/or sensor data. In one embodiment, the data is recorded by independent participants at the event. In one embodiment, one or more recording devices are used at the same event by one or more people. Such devices are able to (simultaneously) record videos (and their associated audio content) and capture auxiliary data. Auxiliary data is captured by auxiliary sensors. "Auxiliary sensors" are any other sensors, apart from camera and microphone, which provide additional data that can be associated to the recorded media (image, video, audio, 3D video, 3D audio, cinemagraph, etc.). Such sensors can be embedded within the media recording device (for sensors such as electronic compasses, accelerometers, gyroscopes and positioning devices), or, in the case of a positioning device such as a GPS receiver, it can be incorporated within another device carried by the same person who records the media, or it can even be a wearable device. The zoom level may be signaled directly by the camera module, so no additional sensor is required for providing such information.

Compasses measure the horizontal orientation with respect to the magnetic north. Accelerometers measure the acceleration on each of three orthogonal axes. Gyroscopes measure the angular velocity and, by integration, the orientation. A positioning device (such as a GPS receiver) measures the location of the device itself. In one embodiment, auxiliary data and video/audio content data are temporally aligned to each other. In addition, data captured by multiple recording devices may be temporally aligned to each other.

As shown in block 510 of FIG. 5, the apparatus 20 embodied by the computing device 10 may also be configured to receive the recorded data. Thus, the apparatus may include means, such as the processor 22 or the like, for causing the reception of the recorded data.

As shown in block 515 of FIG. 5, the apparatus 20 embodied by the computing device 10 may also be configured to classify the recorded data. Thus, the apparatus may include means, such as the processor 22 or the like, for causing the classification of the recorded data. By way of example, the recorded data may be classified into an event, such as soccer or basketball. The classification process will be explained in more detail in FIG. 6.

As shown in block 520 of FIG. 5, the apparatus 20 embodied by the computing device 10 may also be configured to select an event type template. Thus, the apparatus may include means, such as the processor 22 or the like, for causing the selection of the event type template. In one embodiment, the event type template may be selected based on the result of the classification step. In an alternative embodiment, an event may comprise a plurality of event type templates. A plurality of event type templates may be selected. Event type templates will be explained in more detail in FIGS. 7, 8, and 9.

As shown in block 522 of FIG. 5, the apparatus 20 embodied by the computing device 10 may also be configured to assign roles. Thus, the apparatus may include means, such as the processor 22 or the like, for causing the assigning of roles. In one embodiment, the roles assignment is a function of the selected event template and may include instructions for one or more recording devices. The instructions may include one or more specific subjects of interest, objects of interest, and/or scenes or concepts of interest to capture. The roles may be based one or more of the capabilities of the person and/or camera performing the recording. Additionally or alternative, the assigning of roles may be performed and/or re-performed during and/or after the detecting of object step discussed next.

As shown in block 525 of FIG. 5, the apparatus 20 embodied by the computing device 10 may also be configured to detect objects and/or events of interest in the recorded data. Thus, the apparatus may include means, such as the processor 22 or the like, for causing the detection of objects and/or events of interest in the recorded data. The detection step will be explained in more detail in FIG. 10.

As shown in block 530 of FIG. 5, the apparatus 20 embodied by the computing device 10 may also be configured to create remix video content. Thus, the apparatus may include means, such as the processor 22 or the like, for causing the generation of remix media content.

As shown in block 535 of FIG. 5, the apparatus 20 embodied by the computing device 10 may also be configured to present the media content. Thus, the apparatus may include means, such as the processor 22 or the like, for causing the presenting of the media content.

FIG. 6 shows a flow chart illustrating operations performed, such as by the apparatus 20, in accordance with an example embodiment of the present invention. Specifically, FIG. 6 shows an expanded classification step 515 of FIG. 5. Blocks 505a, 505b, 505n, and 510 are shown in FIG. 5 and duplicate description is omitted.

As shown in block 605 of FIG. 6, the apparatus 20 embodied by the computing device 10 may also be configured to classify the recorded data according to a genre. Thus, the apparatus may include means, such as the processor 22 or the like, for causing the classification of the recorded data according to genre. Genres may include "sport" and "non-sport". To classify a genre, the following non-exhaustive list of input features may be used: level of occurrence of green (or other colors such as but not limited to brown or blue) as the dominant color; average dominant color change rate; level of average brightness; average brightness change rate; audio class; camera panning rate; camera tilting rate and/or audio similarity. By way of example, a genre may be classified as a sports genre in instance in which one or more of the following occurred: high level of occurrence of green (or brown or blue) as dominant color; low average dominant color change rate; high level of average brightness; low level of average brightness change rate; audio class being "no music"; high level of panning rate; and/or high level of tilting rate.

As shown in block 610 of FIG. 6, the apparatus 20 embodied by the computing device 10 may also be configured to perform feature extraction. Thus, the apparatus may include means, such as the processor 22 or the like, for causing the extraction of features. Features may be extracted from the visual data (e.g. images and/or video), the audio, and/or the sensor data. Global visual low-level features, local visual low-level features, and high-level visual features or any combination thereof may be extracted from the visual data.

Global visual low-level features may comprise brightness level and/or MPEG-7 features, such as dominant color, color layout, color structure, scalable color, homogeneous texture, edge histogram, etc.

Local visual low-level features may comprise any combination of static keypoint descriptors such as SIFT (Scale-Invariant Feature Transform) and SURF (Speeded Up Robust Feature), or spatio-temporal interest points such as STIP (Space-Time Interest Points), etc. STIP features may be considered to be discriminative for a sport-genre classification because videos of different sport-genres (e.g., soccer and tennis) may comprise people and objects which move with different patterns; such temporal patterns can be captured by extracting and classifying STIP features. For example, players can be firstly detected in the video frames and segmented, and then STIP features can be extracted from them. Also, other features which are derived from STIP can be used, such as velocity histories of spatio-temporal keypoint. Additionally, videos recorded by handheld cameras (such as camera-enabled mobile phones) may be characterized by high camera motion (both intentional and unintentional)—STIP features are processed to take into account the camera motion. This step is needed so that the processed STIP features will carry information only about the motion of recorded people/objects, and not about the camera motion. Thus the camera motion may be estimated. Once estimated, the camera motion may be subtracted from the motion detected by STIP features.

High-level visual features may comprise any combination of detected skin color area, faces (and derived features, such as number and size of faces), people (and derived features, such as number and size of people), camera operations (pan, zoom, etc., extracted by visual content analysis), characteristic objects (e.g., swimming pool for swimming competitions, goalmouth for soccer matches, wedding dress for weddings, electric guitar for rock concerts). Each of the high level visual features may be expressed as a probability value (for example, the probability that in a certain video frame there is a goalmouth could be 0.7).

From audio data, low level audio features and high level audio features may be extracted. Low-level audio features may comprise MFCC (Mel-Frequency Cepstrum Coefficients) features and high level audio features may comprise transcripts from automatic speech recognition, detected characteristic acoustic semantic concepts (music, cheering, motor noises for motor sports, sounds originating from water, sounds originating from hitting a tennis ball, etc.).

From compass data the following features (or a subset of them) may be extracted for each video sequence: camera panning rate [Hz] (where each camera panning movement is detected by analyzing the compass data captured during the video recording), i.e., number of panning movements over time unit, computed as $$R_p = \frac{N_p}{L}$$

where $N_p$ is the number of panning movements and L is the length of the considered video; average, median, minimum and maximum camera panning extent (angular difference between the unwrapped angles of the two endpoints of each panning), where the average panning extent may be computed as $$E_p^{avg} = \frac{1}{N_p} \sum_{i=0}^{N_p-1} C_i^{end} - C_i^{beg} \text{ [rad]}$$

($C_i^{end}$ and $C_i^{beg}$ are the compass directions respectively at the end and at the beginning of each camera panning for the i-th video, and all operations are take into account the wrap around 360 degrees, i.e. by using modulo operations); average, median, minimum and maximum camera panning speed (angular speed), where the average panning speed may be computed as $$S_p^{avg} = \frac{1}{N_p} \sum_{i=0}^{N_p-1} \frac{C_i^{end} - C_i^{beg}}{t_i^{end} - t_i^{beg}} \text{ [rad/s]}$$

(where $t_i^{end}$ and $t_i^{beg}$ are the timestamps respectively at the end and at the beginning of each camera panning); standard deviation of horizontal orientation. [rad]; variance of horizontal orientation, computed as $$\sigma_c^2 = \frac{1}{N_c} \sum_{i=0}^{N_c-1} (C_i - \mu)^2 \ [rad2]$$

(where $C_i$ is the i-th compass direction, $N_c$ is the number of compass directions and $\mu$ is the circular mean value of compass directions); other moments (apart from variance) of horizontal orientation; panning direction-change rate, computed as $$R_p^{dir} = \frac{\sum_{i=0}^{N_p-2} d_i}{N_p} \ [Hz]$$

where the direction-change $d_i$ can be either 1 or 0, depending if there is a direction change (e.g. from panning left to panning right or vice-versa) or not; DC (0-frequency) component and higher frequency harmonics of DCT (or similar transform such as FFT) applied on compass data; average, median, minimum and maximum panning duration [s].

From accelerometer data the following features (or a subset of them) may be extracted: camera tilting rate. [Hz]; average, media, minimum and maximum camera tilting speed. [rad/s]; average, media, minimum and maximum camera tilting extent (angular difference between the unwrapped angles of the two endpoints of each tilting). [rad]; standard deviation of vertical orientation. [rad]; variance of vertical orientation. [rad2]; other moments (apart from variance) of vertical orientation; average, median, minimum and maximum tilting duration, where the average duration is computed as $$D_t = \frac{1}{N_t} \sum_{i=0}^{N_t-1} t_i^{end} - t_i^{beg} \ [s]$$

(where $N_t$ is the total number of tilting movements); DC (0-frequency) component and higher frequency harmonics of DCT (or similar transform such as FFT) applied on accelerometer data; change rate of tilting direction [Hz].

From gyroscope data the following features (or a subset of them) may be extracted: camera panning and tilting rate. [Hz]; average, median, minimum and maximum camera panning and tilting speed. [rad/s]; average, median, minimum and maximum camera panning and tilting extent. [rad]; standard deviation of horizontal and vertical orientation. [rad]; variance of horizontal and vertical orientation. [rad2]; other moments (apart from variance) of horizontal and vertical orientation; average, median, minimum and maximum camera panning and tilting durations [s]; DC (0-frequency) component and higher frequency harmonics of DCT (or similar transform such as FFT) applied on gyroscope data; change rate of camera panning and tilting directions [Hz].

Zoom level information may be manipulated in order to obtain zoom-based features, such as the followings: average, median, minimum and maximum extent of zoom [measured either as change in focal length or as change in zoom levels]; zoom rate [Hz]; average, median, minimum and maximum speed of zooming [change in focal length/seconds]; variance of the focal length; standard deviation of the focal length; zoom direction (i.e., zoom-in, zoom-out); change rate of zoom direction [Hz].

After the feature extraction has completed, a feature selection step may be used for selecting the most informative sub-set of features to be used in sub-sequent steps. In addition or alternatively, a feature synthesis step can also be performed, where new features (instead of a sub-set) with higher discriminative power are generated. Moreover, the obtained feature vectors might need to be normalized (i.e. scaled)—for this, any suitable method can be used, such as Z-score normalization which reduces each feature to 0 mean and variance equal to 1.

As shown in block 620 of FIG. 6, the apparatus 20 embodied by the computing device 10 may also be configured to perform early fusion. Thus, the apparatus may include means, such as the processor 22 or the like, for causing the early fusion of extracted features. Fusion is described in detail with regard to step 650.

The extracted features represent the input to a set of classifiers. Each classifier is fed with one or more features extracted from the input data modalities. In a simple case, all features extracted from the same data modality (e.g., all features from visual modality, or all features from audio modality, or all features from auxiliary data modality) may be fed into a single classifier and thus three classifiers will be utilized—i.e., one classifier for visual data ("visual classifier"), one for audio data ("audio classifier") and one for auxiliary sensor data ("sensor classifier"). Additionally or alternatively, a supervised classification strategy may be utilized, thus a learning phase may be required for training the classifiers. Examples of classifiers that can be used for the purpose of this invention are SVMs (Support Vector Machines), Artificial Neural Networks, Classification Trees, etc. However, the present invention is not restricted to the specific type of classifier.

As shown in block 630*a* of FIG. 6, the apparatus 20 embodied by the computing device 10 may also be configured to classify the extracted video features. Thus, the apparatus may include means, such as the processor 22 or the like, for causing the performance of video feature classification.

As shown in block 630*b* of FIG. 6, the apparatus 20 embodied by the computing device 10 may also be configured to classify the extracted audio features. Thus, the apparatus may include means, such as the processor 22 or the like, for causing the performance of audio feature classification.

As shown in block 630*c* of FIG. 6, the apparatus 20 embodied by the computing device 10 may also be configured to classify the extracted sensor features. Thus, the apparatus may include means, such as the processor 22 or the like, for causing the performance of sensor feature classification.

As shown in block 640 of FIG. 6, the apparatus 20 embodied by the computing device 10 may also be configured to perform relational analysis. Thus, the apparatus may include means, such as the processor 22 or the like, for causing the performance of relational analysis. Relation analysis refers to a joint analysis of different features (from the same data modality or from different data modalities) which allows for discovering correlative or anti-correlative relations (between features) that are discriminative for a considered classification. The analysis may be applied to data captured by only one camera, and also to parallel data streams (i.e. video, audio, and sensor signals captured by different recording devices). Such relations can be modeled for enhancing the sport-genre classification results. For example the models may be obtained by using training data. The relation analysis will enhance the discrimination of only those classes for which models of relations are available.

Considered relations may include co-occurrence in a certain temporal window, spatial, or temporal sequence. Co-occurrence in a certain window: e.g. a co-occurrence of certain values for dominant color feature (from visual data) and panning speed (from compass data) can be help in discriminating between swimming and tennis sports. In fact, swimming has usually blue (of the water) as dominant color whereas tennis has red or green as dominant color (the field); furthermore, videos of swimming competitions are characterized usually by panning movements with lower speeds with respect to tennis.

Spatial—for example a combination of different dominant colors in the video frames, such as (in the case of soccer) green in the bottom (the field) and blue in the top (the sky).

Temporal sequence—sequence of features or patterns, e.g., during a swimming competition a camera usually performs a panning movement, then it stops (when the competition ends) and the spectators start applauding. The camera movements can be detected by compass analysis (or by visual content analysis), whereas the applause can be detected by audio analysis. In another example, ice-hockey can be discriminated from sport aerobics by analyzing temporal sequences. In fact, both these sports may contain music in the recorded audio; in ice-hockey music is present often but only for short time during the breaks, whereas in aerobics music is present for the whole duration of the event. Thus, analyzing the temporal sequence of music and non-music it is possible to discriminate between these sport types.

Alternatively, relation analysis may be done explicitly or implicitly as a part of the feature extraction (e.g. by finding correlations between different features or temporal patterns of one feature type, or by using spatial pyramids (i.e., by dividing each video frame into blocks and then analyzing relations between features—global or local—extracted from different blocks)), or as a part of the classification (e.g. by using an inherently temporal classification method such as the hidden Markov model (HMM)) or in the fusion stages (e.g. by using statistical analysis of the distribution of decision scores of all the fused classifiers, to estimate the reliability of the decisions of one particular, or predefined, classifier).

As shown in block 650 of FIG. 6, the apparatus 20 embodied by the computing device 10 may also be configured to perform fusion of the feature classification. Thus, the apparatus may include means, such as the processor 22 or the like, for causing the performance of fusion on feature classification.

Fusion is the process of obtaining a single decision from a set of base features, or a set of base classifier output decisions or probabilities, which have possibly been enhanced with relation analysis. The main goal is to reduce the level of uncertainty that the single features or classifiers have by utilizing their complementary information. Either an early fusion strategy (i.e. concatenating all the features before feeding them to a single classifier) or a late fusion strategy (i.e. using a number of classifier equal to the number of features, and feeding each classifier with only one feature) or a hybrid early and late fusion strategy may be performed. In the case of hybrid strategy the number of classifier will be greater than one and less than the number of features; sub-sets of features will be concatenated and fed into the same classifier (for example features from the same modality such as video are concatenated and sent to a visual classifier) and then the outputs from the classifiers will be combined by using a late fusion strategy. The classification result which is output by a classifier can be either a class label or a set of probabilities (one probability for each class).

In another embodiment of the present invention, different late fusion methods may be employed.

In one embodiment, in an instance in which each classifier outputs only the most probable class label, one simple method is majority voting, which consists of selecting the class label which is output by most classifiers. Alternatively, if the probability of the output class label is available, this can be used as the confidence of the classifier and used to compute a score. A score is computed for each class label by summing up the confidences of the classifiers which vote for that class label. Then the class with highest score is the final predicted class. For example, if the sensor classifier predicts class 1 with probability 0.7, the visual classifier predicts class 1 with probability 0.5, the audio classifier predicts class 2 with probability 0.8, the class 1 will be the final prediction because the sum of the probabilities 0.7 and 0.5 is greater than 0.8. Another way of using a single confidence (the highest probability) per classifier is the "winner-take-all" method which consists of selecting the class that is output by the "most confident" classifier, i.e. the one with highest confidence among all the classifiers.

In another embodiment, in an instance in which each classifier outputs a set of probabilities (i.e. one probability for each class, not just the class with highest probability), a fusion method may consist of obtaining a score for each class and then the final predicted class will be the one with highest score. The score for a certain class is obtained by averaging the output probabilities of the classifiers with respect to that class.

In an alternative embodiment, the average may be computed as a weighted average, where the weights may be the accuracies of the classifiers (estimated on a test set or by using cross-validation) or may be estimated by other means.

In another embodiment, fusion is performed by training an additional classifier (a "probability-classifier") by using the outputs (decision labels or scores) of the classifiers to be fused. Alternatively, boosting of classifiers can be used too, where classifiers are organized in sequence instead of in parallel. During training, each sub-sequent classifier is trained on a partition of the feature space where the previous classifiers do not perform well. This is achieved by considering, at each sub-sequent classifier, the most informative training samples, which include those samples that were misclassified by the previous classifiers. Alternatively, fusion based on (either regularized or not regularized) Logistic Regression; arithmetic rules applied to classifier output decision labels or scores; or fusion methods based on Multiple Kernel Learning may be used.

Additionally or alternatively, adaptation of the fusion process can be performed with respect to the quality of the input data modalities. First, for each modality, the quality of the corresponding input data is estimated. For compass data, the quality level may be derived from the compass calibration level. For accelerometer data, the quality level may be derived from the shakiness of the camera—accelerometer-based features would not be reliable if the camera is most of the time very shaky. For visual data, any visual quality measure can be used, such as darkness, presence of visual noise, etc. For audio data, any audio quality measure can be used, such as noisiness, presence of high energy cheering (from spectators), etc. If the quality of a certain modality is not sufficiently high, it might mean that all features extracted from that data modality are not reliable. The quality levels are then analyzed for deciding how to adapt the fusion process. The quality levels can be thresholded in order to get good/bad sensor quality, good/bad visual quality, and good/bad audio quality. In the majority voting fusion strategy, in case for a certain modality the quality is bad, the class predicted by the classifier analyzing that modality will not have any impact or influence on the voting. Regarding the (weighted or non-weighted) Average and the probability-classifier fusion approaches, if the thresholded quality level of a certain modality is bad, the probabilities which are output by the corresponding classifier are set to uniform probabilities (i.e. each class has equal probability), thus that modality will not influence the fusion process. Alternatively, regarding the weighted Average fusion approach, the (non-thresholded) quality level of a certain modality can influence the weight of that modality in the average, by lowering or increasing it. Alternatively, regarding the probability-classifier fusion approach, the (non-thresholded) quality levels may be used as additional input features to the probability-classifier. Also, cross-modality adaptation of the fusion process is possible, i.e. analyze one data modality (e.g. accelerometer data) for adapting the influence of another modality (e.g., video). An example of cross-modality adaptation; if the accelerometer data indicates that the recorded videos are shaky, some visual features such as texture-based features might be noisy (because the video may be blurry); thus, the influence of the visual modality should be lowered (e.g. by adapting the corresponding weights or the corresponding output probabilities accordingly).

The weights may also be determined by using mathematical optimization algorithms such as the gradient descent. The weight calculation may also be done implicitly in the fusion algorithm, and sparse weights can be used to select optimal classifier subset from a large pool of classifiers. Other fusion methods that may be used in the context of this invention are: those which use different optimization algorithms, such as genetic algorithms, linear programming, or nonlinear programming, for optimal weight search; feeding the whole set of features into different classifiers (i.e. all the classifiers receive the same features as their input) and then performing dynamic classifier selection, which consists of selecting the classifier that performs best in the partition of the feature space where the input data point is mapped. In this way each classifier is treated as an "expert" of a different partition (or region) of the feature space (this approach is known as "mixture-of-experts").

In another embodiment, in an instance in which location information of the recording device(s) (e.g., the one provided by GPS receivers) is available, the location information may be used at the fusion stage for providing additional information about the type of event being held. In particular, by using cartographic data (for example data provided by a Geographic Information System—GIS), it may be determined if the recording devices are located in a venue specific to a particular sport type or to a set of sport types, thus narrowing down the set of possible sport-genres (sport types) and eventually rejecting any non-possible sport-genres. For example, if the devices are located in a big soccer stadium, sports like soccer and athletics may be the only possible sport types (also, the event may be a live music performance). One way of fusing the location information with other classifiers consists of obtaining (from the location information) a set of probabilities (one probability value for each class); then these probabilities are treated as if they were output by an additional classifier and combined in the fusion process with the probabilities output by other classifiers (e.g. using weighted average or a probability-classifier). For example, if the location is where there is a big soccer stadium, the probability for soccer will be 0.5, the probability for athletics will be 0.5, and the probability for any other sport will be 0.

Alternatively, another way for fusing the location information consists of discarding any non-possible sport-genres from the decision process; for example, if the location is where there is a big soccer stadium and the most probable class which is output by the set of classifiers was "Swimming competition", the process would be able to reject this decision and to consider the second most probable class output by the classifiers. Non-possible sport-genres (based on the location information) may be discarded even before fusing the classifiers, so that each classifier would consider only those sport-genres which are possible given the venue/location.

Additionally or alternatively, the relative position of players can be used for giving more weight or to exclude some sport genres in the fusion process. The images or videos containing players can be analyzed in order to understand whether players of different teams stand on the same area or on different sides of the sport field. This will help to discriminate between sports where players of both teams can move within approximately the same area (e.g., soccer, basketball, etc.) and sports where players of different teams are allowed to move only within separate sides/areas (e.g., volleyball, tennis, etc.). For example, if such analysis outputs "teams on different sides", this result can be used for increasing the weights of those sport types in which players of different teams move in separates areas. A possible implementation of such analysis consists of firstly detecting and locating the players, then analyzing the color (and eventually other visual features) of their clothes and, for example by means of clustering, assigning each player to the respective team. In this way it will be possible to compute the relative positions of players belonging to different teams, and thus to compute the relative positions of the teams. However, any possible implementation can be used, as long as it allows for understanding that players of different teams are either always on different sides of the field or can be on the same side.

FIG. 7 is a block diagram illustrating an event type template 700 according to one aspect of the present invention. An event type template 700 may comprise information related to assigning roles for one or more recording devices 720, information related to selecting a sub-set of editing rules 730, information related to selecting a sub-set of potential salient events 740, and information related to selection of potential salient objects 750.

The obtained sport-genre label can be utilized for selecting a sub-set of cinematographic/video-editing rules which may be used for automatically producing the final remix video. Such a sub-set of rules is selected in such a way that it is the most appropriate for that particular sport-genre. The sub-set of rules is a portion of the full set of available rules. Such rules can be stored in any suitable format, such as SWRL (Semantic Web Rule Language) and RuleML (Rule Markup Language). The categorization of the different sub-sets of rules (i.e. deciding which sub-set is the most appropriate for each sport-genre) may be done off-line, for example by human experts. Examples of cinematographic/video-editing rules may include using specific video-transition types, having video segments (constituting the final remix video) of specific durations, using particular sequence-patterns for shot-sizes (i.e., one long-shot followed by two close-ups), selecting the cameras to be used at each time instant based on a particular pattern (e.g. in sports like soccer, American football and basketball it might be beneficial to select the cameras which follow the action or the ball).

Furthermore, once the final sport-genre label is obtained, the system can automatically select the sub-set of salient events which are the most likely to occur in the videos. For example, if "soccer" sport type is detected, only those salient events related to soccer are considered in successive analysis steps, such as the "soccer-goal scoring" event, the "corner kick" event, "penalty kick" event, "free kick" event, etc., whereas events related to other sport (such as the "start" event in swimming competitions) are not considered. In this way, the system does not need to look for the occurrence of all possible events belonging to all sport types, but only for a smaller number of salient events. This will increase the likelihood of correct salient event detection. The detected salient events can then be used for automatically generating a video summary of the recorded event. This can be done by identifying the video segments containing the salient events and then stitching such segments one after the other (for example by preserving the original temporal order). In case the sport-genre classification and the salient event detection is performed on a mobile phone, and the summary video is performed on an external computing unit (e.g., a server), then only the detected salient events need to be sent from the phone to the server, thus reducing the amount of data to be sent and the bandwidth consumption.

By using the same approach, the system can also select the most suitable sub-set of objects of interest for that particular event type. For example objects of interest for soccer are goalmouth, soccer-ball, etc.

The obtained event type classification may be used for assigning roles to the recording users and for selecting suitable sub-sets of editing rules, salient events and salient objects. An event may consist of one or more sub events. These sub events may be overlapping in time but occurring at different spaces in the event venue. For example, the guests may be assembling in a different part of the event venue and the wedding may occur in yet another part of the event venue. Users participating in the event may be equipped with a recording device that can capture audio/video/sensor data as well as equipped with client software which can connect with a server. Each user may have a profile description stored along with his/her social demographic information as well as connections with other users attending the event (if such a connection exists).

Additionally or alternatively, this information is collated by, collected and/or compared to the data about the recording client equipped participants in the event. The personal, demographic and/or social information along with the event environment sensing may be used for determining the correct set (one or more) of event type templates to be invoked for creating the roles that are assigned to the participating recorders.

FIG. 8 shows a flow chart illustrating operations performed, such as by the apparatus 20 of FIG. 2, in accordance with an example embodiment of the present invention. Specifically, FIG. 8 shows the process of role assignment and how the process of role assignment affects the positioning of the recording.

In an exemplary, non-limiting, embodiment, block 810 illustrates a number of guests at an event. The participant's recording devices sense the ambience of the event and deliver the sensor data or derived inference data generated by fusion of multiple sensors and audio-visual content analysis performed on the device. The raw information and/or derived information may factor into the determining of one or more of the objects or events to detect that may be in progress.

Target audience information may be acquired based on a default user profile preference or it may be provided by the user while requesting the remix. In order to affect the role assignment and content capture, the target audience information may need to be available before the end of the event. The target audience information may further factor in the event type template determination by influencing the editing rules which results in remix content that is semantically more appealing to the specified audience. The appealing content is identified in the subsequent parts of the implementation regarding role assignment.

As shown in block 820 of FIG. 8, the apparatus 20 embodied by the computing device 10 may also be configured to receive the recorded data, invoke an event type template or a combination of event type templates, create roles for one or more of the recording devices, and assign the created roles to the associated recording device. Thus, the apparatus may include means, such as the processor 22 or the like, for causing the reception of the recorded data, invoking of an event type template or a combination of event type templates, creation of roles for one or more of the recording devices, and assignment of the created roles to the associated recording device.

Role creation and/or role assignment may be done using sensor information from the event, context information from the participants and the composition target audience. Role creation may depend on (but may not be limited to) the combined templates (if more than one template is invoked) and the number of recording participants available in the event may be performed. Role assignment to individual users may depend on (but may not be limited to) role priority, proximity to other related roles, proximity to a specific object or event, optimal device capability and capture modalities. In one embodiment, intentional role redundancy may be created and/or assigned depending on the priority of the role as well as the number of available recording participants.

As shown in block 825 of FIG. 8, the apparatus 20 embodied by the computing device 10 may also be configured to signal the assigned roles to the targeted recording participants. Thus, the apparatus may include means, such as the processor 22 or the like, for causing the signaling of the assigned roles to the targeted recording participants.

Block 830 shows recording participants R1-R4, Rp1-Rp3, and Rf1-Rf2 in the created and assigned roles. The recording participants may be signaled regularly to assist them and/or remind them of the role. In one embodiment, if the participant is detected to not follow the role for more than predefined threshold duration or more than predefined threshold reminders, he/she may be dropped from the role and the role may reassigned to the other suitable user based on the role priority. In one embodiment, a high priority role may never be superseded by a lower priority role to ensure the most important perspectives of the event are captured for the final composition.

As another aspect of the invention, one or more event templates are invoked dynamically based on the specific details of the event but also the target audience of the composition. Thus in addition to the event nuances and requirements of the target audience is incorporated into the decision making for invoking the templates and subsequently for creating the roles to provide the content for the one or more event templates.

As a consequence of combining multiple templates to generate a composition that satisfies the target audience interest requirements, the roles may also change compared to the scenario where the roles are created based on the event type. For example: A wedding of style A may invoke Wedding-Style-A template consisting of roles R1, R2, R3, R4 and R5. A party of style A may invoke Party-Style-A template consisting of roles Rp1, Rp2, and Rp3. A friend's link-up of style A may invoke Friends-Style-A template consisting of roles Rf1, Rf2, and Rf3. Subsequently, if the wedding of style A needs to have a composition that satisfies three different target audiences, namely family, community, and friends, roles may change accordingly. For example, regarding family; A higher percentage of content from the actual wedding ceremony and also close relatives attending the wedding would be needed more than, for example, the post wedding party or parts consisting of non-family guests. A template configuration consisting of: Wedding-Style-A (two-third weightage)+Party-Style-A (one-third weightage) Total Roles: R1, R2, R3, R4-Rp1, Rp2, Rp3. (which is different from the set of roles in case of individual templates as some roles may be merged and others omitted) if the number of recording participants is limited. Regarding community; Since this will be for a larger and a more public audience, the content needs to contain less of family relatives and more content related that is identified well by the larger audience. Template configuration consisting of: Wedding-Style-A (full weightage) Total Roles: R1, R2, R3, R4, and R5. Regarding friends: Since this will be a more personal group consisting of friends who may not necessarily be interested in all the wedding ceremony details and also not interested in close relatives of the bride and groom. This group will be more interested to have content that contains the friends and people known to the friends. Template configuration consisting of: Party-Style-A (half weightage)+Friends-Style-A (half weightage). Total Roles: Rp1, Rp2, Rp3, Rf1-Rf2, Rf3. (which is different from the set of roles in case of individual templates as some roles may be merged and others omitted) if the number of recording participants is limited.

Thus, it can be seen that different parts (in terms of time as well as location) of the event are of more interest to different audience types. Thus, in one embodiment, the roles may be created based on the intended target audience consumption requirements.

In yet another embodiment of the invention, the one or more events may be combined to generate a single composition. The weightage of different events may be based on the user preference requesting the compositions.

Referring now to FIG. 9, a flow chart is depicted that illustrates operations performed, such as by the apparatus 20 of FIG. 2, system 300 of FIG. 3, or apparatus 410 of FIG. 4, in accordance with an example embodiment of the present invention. Specifically, FIG. 9 shows how the classification is used in the selecting of a sub-set of salient event, a sub-set of salient objects, and the selection of a sub-set of editing rules.

As shown in block 905 of FIG. 9, the apparatus 20 embodied by the computing device 10 may also be configured to classify recorded data into an event or sub-event, such as a sport type (e.g. soccer). Thus, the apparatus may include means, such as the processor 22 or the like, for causing the classification of recorded data into an event or sub-event.

As shown in block 910 of FIG. 9, the apparatus 20 embodied by the computing device 10 may also be configured to select a sub-set of editing rules based on the classification of the recorded data. Thus, the apparatus may include means, such as the processor 22 or the like, for causing the selection of a sub-set of rules from a full set of rules based on the classification of the recorded data. The selection of the sub-set of rules may be performed in accordance with a sub-event type assigned to the recorded data and picked from the full set of rules 915.

As shown in block 920 of FIG. 9, the apparatus 20 embodied by the computing device 10 may also be configured to select a sub-set of events based on the classification of the recorded data. Thus, the apparatus may include means, such as the processor 22 or the like, for causing the selection of a sub-set of events from a full set of salient events based on the classification of the recorded data. The selection of the sub-set of events may be performed in accordance with a sub-event type assigned to the recorded data and picked from the full set of salient events 925.

As shown in block 930 of FIG. 9, the apparatus 20 embodied by the computing device 10 may also be configured to select a sub-set of objects based on the classification of the recorded data. Thus, the apparatus may include means, such as the processor 22 or the like, for causing the selection of a sub-set of objects from a full set of salient objects based on the classification of the recorded data. The selection of the sub-set of objects may be performed in accordance with a sub-event type assigned to the recorded data and picked from the full set of salient objects 935.

As shown in block 940 of FIG. 9, the apparatus 20 embodied by the computing device 10 may also be configured to detect the sub-set of objects selected in step 930 and the sub-set of events selected in step 920. Thus, the apparatus may include means, such as the processor 22 or the like, for causing the detection the sub-set of objects selected in step 930 and the sub-set of events selected in step 920.

As shown in block 950 of FIG. 9, the apparatus 20 embodied by the computing device 10 may also be configured to generate a remix video in accordance with the selected sub-set of editing rules from step 910 and the objects and events detected in step 940. Thus, the apparatus may include means, such as the processor 22 or the like, for causing the generation a remix video in accordance with the selected sub-set of editing rules from step 910 and the objects and events detected in step 940.

Next, efficient object detection will be described.

Regarding object detection, in one embodiment, the present invention considers recording devices which are capable of simultaneously capturing different data modalities. In particular, the considered data modalities are the followings (but not limited to these) video and images (from the visual sensor(s)), audio (from the microphone(s)), and data describing the horizontal rotational orientation of the recording device (e.g., such as the data provided by an electronic compass or a gyroscope), data describing the vertical rotational orientation of the recording device (e.g., such as data provided by a tri-axis accelerometer or a gyroscope), and position/location information of the recording device (such as data provided by a Global Positioning System (GPS) receiver).

In an embodiment of the present invention, all data modalities are temporally aligned with each other, i.e., the beginning and ending timestamps of the data streams for different data modalities captured simultaneously are coinciding, as well as all the intermediate timestamps. When recording a video, the data modalities are captured by using potentially different sampling rates (e.g., 25 frames per second for the visual data and 10 samples per second for the horizontal rotational orientation). Instead, when capturing a still image, we assume to capture 1 horizontal rotational orientation, 1 vertical rotational orientation and 1 position (no audio is recorded in this case). The capture frequency of different modalities is only an example, other variations are possible based on different embodiments of the implementation.

Referring now to FIG. 10, a flow chart is depicted that illustrates operations performed, such as by the apparatus 20 of FIG. 2, system 300 of FIG. 3, or apparatus 410 of FIG. 4, in accordance with an example embodiment of the present invention. Specifically, FIG. 10 shows an alternative embodiment of detection step 535 from FIG. 5 including an offline phase 1010 and an online phase 1015.

In one embodiment of the present invention, as shown in block 1020 of FIG. 10, the apparatus 20 embodied by the computing device 10 may also be configured to collect a set of templates. Thus, the apparatus may include means, such as the processor 22 or the like, for causing the collecting of a set of templates. In one embodiment of the present invention, a set of templates for a plurality of types of events.

The collecting of a set of templates may be used in the online phase when template matching needs to be performed (for object detection). In one embodiment, collecting a set of templates comprises capturing a set of images in which the object of interest appears in different conditions in terms of rotation, scale and illumination.

This method may further comprise capturing multimodal templates by using special recording devices 1030a and 1030b. A multimodal template consists of a template image and its associated auxiliary sensor data. As shown in block 1025 of FIG. 10, the apparatus 20 embodied by the computing device 10 may also be configured to capture multimodal templates by using special recording devices. Thus, the apparatus may include means, such as the processor 22 or the like, for causing the capturing of multimodal templates by using special recording devices.

The template collection process is performed separately for each considered type of event. For example, soccer and tennis as two different types of events. For each of these two types, multimodal templates from various venues which represent all possible venues for that event type are captured, for example in terms of size (e.g., for soccer, we capture templates from soccer stadiums of different sizes). For each venue (e.g., for each soccer stadium) we capture templates from all (or a sub-set of) the possible positions where the recording devices can be located in the audience/spectators area (e.g., from all the spectator seats in a soccer stadium). All the multimodal templates obtained from each event type are stored as a separate set.

Regarding data describing the horizontal rotational orientation of the recording device as a modality, venue orientation may be set based on a vertical and horizontal orientation. The vertical orientation of the recording devices in different locations may be directly compared because the vertical position of the place where the event is held is usually the ground level. However, the horizontal orientation of the venue (e.g., the orientation of the longer side of a soccer field) may be any, for example 0 degrees (with respect to magnetic north), 45 degrees, 276 degrees, etc. Thus it is not possible to perform a direct comparison of the horizontal rotational information captured by recording devices in different venues of the same event type (e.g., in different soccer stadiums).

In one embodiment of the present invention, in order to "normalize" such horizontal orientations of the devices (which are originally expressed with respect to north), orientation of the venue (with respect to north) may be obtained. Once this orientation is obtained, orientation of the devices with respect to the venue orientation may be expressed, and venue orientation to the reference value of 0 degrees may be set. This may be done for the auxiliary sensor data captured during both the template collection (offline phase) 1010 and the online phase 1015.

The venue orientation may be obtained in one of a number of different ways, including but not limited to, derivation from a Geographic Information System (GIS) by using the location of the recording device (which is part of the auxiliary sensor data); inputted into the system which performs the analysis by the people who manage the event venue; inputted by the user of the recording device on the recording device. Subsequently, this information may be sent together with the input data (as metadata information) to the system performing the analysis. Alternatively, by means of computer vision techniques coupled with the knowledge of the horizontal orientation of the recording device, it is possible to identify the approximate orientation of the venue.

In the case of rectangle-like shapes of the venue, such as for soccer and volleyball, if there are multiple recording devices recording the event orientation of the venue may be obtained in the following ways: by analyzing the relative position of the recording devices it is possible to understand on which side each device is located. If there is a sufficiently high number of devices which are uniformly distributed around the event venue (e.g., around the soccer field), it is possible to infer where the longer and shorter sides of the venue are located, and thus to infer the orientation of the venue.

In one embodiment, where position information of the multiple recording devices is not available, the horizontal rotational orientation of the devices may be exploited to infer their position with respect to the field. In particular, the case in which the devices have been recording videos during the event is considered. During the video recording the most commonly used camera movement is panning (horizontal and rotational movement), which can be detected in a computationally efficient way by analyzing the data provided by the compass. Panning extent is usually very different depending on which side of the field the device is recording from. For example, a device located on the shorter side of a soccer field will have a smaller panning extent than another device which is located on the longer side of the same field. Thus, by analyzing the panning extents it is possible to infer the position of the devices around the field, and thus to infer the orientation of the field in the same way as already described in the previous bullet.

The online phase 1015 is described next.

As shown in block 1035 of FIG. 10, the apparatus 20 embodied by the computing device 10 may also be configured to capture input data. Thus, the apparatus may include means, such as the processor 22 or the like, for causing the capture of input data. In the capturing step, image and/or video data and associated auxiliary sensor data 1040 may be captured.

As shown in block 1045 of FIG. 10, the apparatus 20 embodied by the computing device 10 may also be configured to identify a type of event and select a related template set. Thus, the apparatus may include means, such as the processor 22 or the like, for causing the identification of the type of event and the selection of the related template set. In one embodiment, the related template set is selected from a storage medium where a complete set of templates for each of a plurality of event types are stored. The specific type of event may be identified in one of a many different ways. In one embodiment, identification comprises receiving a manually input event type. Alternatively, automatic approaches may analyze the input data for inferring the event type, for example by means of computer vision techniques. After the event type is identified, the related set of multimodal templates is selected from all the available sets (that were collected during the offline phase). This set represents a full set of templates from which the detection method extracts an optimal sub-set for performing template matching, which will be described in step 1060.

As shown in block 1055 of FIG. 10, the apparatus 20 embodied by the computing device 10 may also be configured to analyze the auxiliary sensor data from the video/image and auxiliary data 1040 and analyze the auxiliary sensor data of the set of templates that were selected in step 1045. Thus, the apparatus may include means, such as the processor 22 or the like, for causing the analysis of the auxiliary sensor data from the video/image and auxiliary data 1040 and analysis of the auxiliary sensor data of the set of templates that were selected in step 1045.

Next, as shown in block 1060 of FIG. 10, the apparatus 20 embodied by the computing device 10 may also be configured to select an optimal sub-set of templates. Thus, the apparatus may include means, such as the processor 22 or the like, for causing the selection of an optimal sub-set of templates. The optimal sub-set of templates The auxiliary sensor data associated to the input image/video is analyzed in order to select the optimal sub-set of image templates. In one embodiment, given the full set of multimodal templates for the recorded event type, the optimal sub-set will consist of those image templates whose associated auxiliary sensor data is similar to the input auxiliary sensor data. In another embodiment, the horizontal rotational orientation of the device (which is part of the auxiliary sensor data) may need to be normalized with respect to the venue orientation, which may be done in one of the ways previously described.

By way of example, the following is an example of how selection may be performed in the case of recording a soccer event. A soccer field has the reference horizontal orientation of 0 degrees, and if the input horizontal rotational orientation of the recording device is 30 degrees, only those template images for which the associated horizontal rotational orientation is in the range [25, 35] degrees may be selected in order to take into account for inaccuracies in the sensor measurements and in the estimation of the field orientation. The vertical rotational orientation may be taken into account in a similar way.

The final step consists of using the selected optimal sub-set of image templates for performing the template matching.

As shown in block 1065 of FIG. 10, the apparatus 20 embodied by the computing device 10 may also be configured to perform template matching. Thus, the apparatus may include means, such as the processor 22 or the like, for causing the performance of template matching. In one embodiment of the present invention, template matching may be performed in pixel-wise template matching. In another embodiment of the present invention, template matching may be performed using feature-based template matching. Feature-based template matching consists of extracting features from both the template and the input image and then matching the extracted features.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
classifying recorded data according to an event type, wherein the recorded data comprises a plurality of modalities;
determining an event template configuration, the event template configuration comprises one or more selected event templates,
wherein determination of the event template configuration comprises selecting each event template based on the event type and a target audience, wherein each event template comprises a set of event-specific image templates;
detecting one or more predefined objects or one or more predefined events in the recorded data in accordance with each event template; and
creating, with a processor, a remix video utilizing the event template and the one or more predefined objects or the one or more predefined events,
wherein each event template, selected based on the event type and the target audience, identifies which one or more predefined objects of a plurality of potential objects or one or more predefined events of a plurality of potential events are to be detected in the recorded data, and
wherein the event template configuration identifies a weighting of each event template's inclusion in the remix video.

2. A method of claim 1, wherein the classifying of recorded data comprises:
estimating a quality level of each input data modality;
extracting one or more features from one or more of the plurality of data modalities;
classifying the one or more extracted features;
performing relation analysis for discovering correlative relations, anti-correlative relations, or a combination thereof between the one or more extracted features; and
performing fusion of feature classification using relation analysis results, quality levels of the input modalities, and location information to determine the event type.

3. A method of claim 1 wherein each event template comprises information related to:
assigning roles to one or more recording devices,
selecting a sub-set of editing rules;
selecting a sub-set of potential salient events; and
selecting a sub-set of potential salient objects.

4. A method of claim 1 further comprising:
assigning roles for one or more recording devices, according to the event type template, to record one or more potential salient events or one or more potential salient objects,
wherein the assigning of roles is a function of one or more of a number of recording devices, a capability of the recording devices, preference information of a person associated with the event, preference information of a person associated with the remix video, or a target audience.

5. A method of claim 1 wherein detecting a predefined object in the recorded data comprises:
selecting a sub-set of image templates; and
performing template matching, wherein selecting of the sub-set of image templates further comprises matching the auxiliary sensor data from the recorded data with auxiliary data associated with available templates.

6. A method of according to claim 1, wherein detecting a predefined object in the recorded data comprises analyzing auxiliary sensor data captured in the recorded data; and
utilizing an offline phase and an online phase, wherein the offline phase comprises collecting a set of multimodal templates, and causing image templates and associated metadata information to be stored,
wherein the associated metadata information is auxiliary sensor data, and
wherein the online phase comprises template matching on the recorded data with a sub-set of the multimodal templates.

7. A method of claim 6, wherein template matching further comprises:
extracting features from the sub-set of image templates;
extracting features from the recorded data; and
matching the extracted features.

8. An apparatus comprising:
a processor and
a memory including software, the memory and the software configured to, with the processor, cause the apparatus to at least:
classify recorded data according to an event type, wherein the recorded data comprises a plurality of modalities;
determine an event template configuration, the event template configuration comprises one or more selected event templates,
wherein determination of the event template configuration comprises software configured to, with the processor, cause the apparatus to at least select each event template based on the event type and a target audience, wherein each event template comprises a set of event-specific image templates;
detect one or more predefined objects or one or more predefined events in the recorded data in accordance with the event template; and
create a remix video utilizing each event template and the one or more predefined objects or the one or more predefined events,
wherein each event template, selected based on the event type and the target audience, identifies which one or more predefined objects of a plurality of potential objects or one or more predefined events of a plurality of potential events are to be detected in the recorded data, and
wherein the event template configuration identifies a weighting of each event template's inclusion in the remix video.

9. An apparatus of claim 8 wherein the at least one memory including the computer program code is further configured to, with the at least one processor, cause the apparatus to:
extract one or more features from one or more of the plurality of data modalities;
estimate a quality level of each input data modality;
classify the one or more extracted features;
perform relation analysis for discovering correlative relations, anti-correlative relations, or a combination thereof between the one or more extracted features; and
perform fusion of feature classification using relation analysis results, quality level of each modality and location information to determine the event type.

10. An apparatus of claim 8 wherein each event template comprises information related to:
assigning roles to one or more recording devices,
selecting a sub-set of editing rules;
selecting a sub-set of potential salient events; and
selecting a sub-set of potential salient objects.

11. An apparatus of claim 8 wherein the at least one memory including the computer program code is further configured to, with the at least one processor, cause the apparatus to:
assign roles for one or more recording devices, according to the event type template, to record one or more potential salient events or one or more potential salient objects,
wherein the at least one memory including the computer program code is further configured to, with the at least one processor, cause the apparatus to:
assign roles as a function of one or more of a number of recording devices, a capability of the recording devices, preference information of a person associated with the event, preference information of a person associated with the remix video, or a target audience.

12. An apparatus of claim 8, wherein the at least one memory including the computer program code is further configured to, with the at least one processor, cause the apparatus to select the sub-set of image templates by matching the auxiliary sensor data from the recorded data with auxiliary data associated to available templates.

13. An apparatus of claim 8, wherein the at least one memory including the computer program code is further configured to, with the at least one processor, cause the apparatus to detect a predefined object in the recorded data by:
analyzing auxiliary sensor data captured in the recorded data;
utilizing an offline phase and an online phase,
wherein the offline phase comprises collecting a set of multimodal templates, and storing image templates and associated metadata information,
wherein the associated metadata information is auxiliary sensor data, and
wherein the online phase comprises template matching on the recorded data with a sub-set of the multimodal templates.

14. An apparatus of claim 13, wherein the at least one memory including the computer program code is further configured to, with the at least one processor, cause the apparatus to perform template matching by:
extracting features from the sub-set of image templates;
extracting features from the recorded data; and
matching the extracted features.

15. A computer program product comprising at least one non-transitory computer-readable storage medium having computer-readable program instructions stored therein, the computer-readable program instructions include program instructions configured, when executed by a computer, to:

classify recorded data according to an event type, wherein the recorded data may comprise a plurality of modalities;

determine an event template configuration, the event template configuration comprises one or more selected event templates, wherein determination of the event template configuration comprises selecting each event template based on the event type and a target audience, wherein each event template comprises a set of event-specific image templates;

detect one or more predefined objects or one or more predefined events in the recorded data in accordance with each event template; and create a remix video utilizing each event template and the one or more predefined objects or the one or more predefined events, wherein each event template, selected based on the event type and the target audience, identifies which one or more predefined objects of a plurality of potential objects or one or more predefined events of a plurality of potential events are to be detected in the recorded data, and wherein the event template configuration identifies a weighting of each event template's inclusion in the remix video.

16. A computer program product of claim 15, wherein the program instructions configured to classify recorded data also include program instructions configured, when executed by a computer, to:

estimate a quality level of each input data modality;

extract one or more features from one or more of the plurality of data modalities;

classify the one or more extracted features;

perform relation analysis for discovering correlative relations, anti-correlative relations, or a combination thereof between the one or more extracted features; and perform fusion of feature classification using relation analysis results, quality level of each input data modality and location information to determine the event type.

17. A computer program product of claim 15 wherein each event template comprises information related to:

assigning roles to one or more recording devices, selecting a sub-set of editing rules;

selecting a sub-set of potential salient events; and selecting a sub-set of potential salient objects.

18. A computer program product of claim 15 wherein the program instructions also include program instructions configured, when executed by a computer, to:

assign roles for one or more recording devices, according to the event type template, to record one or more potential salient events or one or more potential salient objects, wherein the assigning of roles is a function of one or more of a number of recording devices, a capability of the recording devices, preference information of a person associated with the event, preference information of a person associated with the remix video, or a target audience.

19. A computer program product of claim 15 wherein the computer-readable program instructions for detecting the predefined object also include program instructions configured, when executed by a computer, to:

select a sub-set of image templates; and perform template matching, wherein selecting of the sub-set of image templates further comprises matching the auxiliary sensor data from the recorded data with auxiliary data associated with available templates.

20. A computer program product of according to claim 15, wherein the computer-readable program instructions configured to detect a predefined object in the recorded data also include program instructions configured, when executed by a computer, to analyze auxiliary sensor data captured in the recorded data; and utilize an offline phase and an online phase, wherein the offline phase comprises collecting a set of multimodal templates, and causing image templates and associated metadata information to be stored, wherein the associated metadata information is auxiliary sensor data, and wherein the online phase comprises template matching on the recorded data with a sub-set of the multimodal templates.

21. A computer program product of claim 20, wherein the computer-readable program instructions configured for template matching also include program instructions configured, when executed by a computer, to:

extract features from the sub-set of image templates;

extract features from the recorded data; and match the extracted features.

\* \* \* \* \*